US011430258B2

(12) United States Patent
Naruse et al.

(10) Patent No.: US 11,430,258 B2
(45) Date of Patent: Aug. 30, 2022

(54) INFORMATION PROCESSING APPARATUS, PROGRAM, AND INFORMATION PROCESSING METHOD

(71) Applicant: Sony Corporation, Tokyo (JP)

(72) Inventors: Tetsuya Naruse, Tokyo (JP); Hiroki Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 199 days.

(21) Appl. No.: 16/760,462

(22) PCT Filed: Jul. 20, 2018

(86) PCT No.: PCT/JP2018/027365
§ 371 (c)(1),
(2) Date: Apr. 30, 2020

(87) PCT Pub. No.: WO2019/092927
PCT Pub. Date: May 16, 2019

(65) Prior Publication Data
US 2020/0349343 A1 Nov. 5, 2020

(30) Foreign Application Priority Data

Nov. 9, 2017 (JP) .............................. JP2017-216281

(51) Int. Cl.
G06V 40/16 (2022.01)
G06F 21/32 (2013.01)
(Continued)

(52) U.S. Cl.
CPC ............ *G06V 40/169* (2022.01); *G06F 21/32* (2013.01); *G06F 21/6245* (2013.01); *H04L 63/0861* (2013.01)

(58) Field of Classification Search
CPC ...... G06V 40/169; G06V 40/50; G06V 40/70; G06V 40/16; G06V 40/20; G06V 40/40;
(Continued)

(56) References Cited

U.S. PATENT DOCUMENTS

2007/0198286 A1 8/2007 Tomita
2010/0060417 A1 3/2010 Niinuma
(Continued)

FOREIGN PATENT DOCUMENTS

EP 2 887 267 A1 6/2015
JP 2000-222361 A 8/2000
(Continued)

OTHER PUBLICATIONS

International Search Report and Written Opinion dated Sep. 18, 2018 for PCT/JP2018/027365 filed on Jul. 20, 2018, 11 pages including English Translation of the International Search Report.

*Primary Examiner* — Nimesh Patel
(74) *Attorney, Agent, or Firm* — Xsensus LLP

(57) ABSTRACT

Provided is an information processing apparatus capable of preventing unauthorized collation.
An information processing apparatus includes a data acquisition unit configured to automatically acquire a plurality of user data items to acquire feature data of a user on the basis of a time-series change in the plurality of user data items, a determination unit configured to compare a plurality of the feature data items acquired at different timings to determine whether or not the plurality of feature data items indicates an identical feature of the user, and a control unit configured to control authentication processing on the user depending on a first determination result that is a determination result obtained by the determination unit.

18 Claims, 15 Drawing Sheets

(51) Int. Cl.
*G06F 21/62* (2013.01)
*H04L 9/40* (2022.01)

(58) Field of Classification Search
CPC .. G06V 40/176; G06V 40/165; G06V 40/167;
G06V 40/172; G06V 40/174; G06V
10/17; G06V 40/193; G06V 20/52; G06V
40/103; G06V 40/15; G06V 40/10; G06V
40/161; G06V 40/1365; G06F 21/32;
G06F 21/6245; G06F 3/011; G06F
2203/011; G06F 40/30; G06F 3/012;
G06F 16/436; G06F 3/015; G06F 3/0482;
G06F 3/048; G06F 16/54; G06F 3/0481;
G06F 3/01; G06F 21/36; H04L 63/0861;
G06T 7/00; H04N 1/00381; H04N
1/00437; H04N 5/23219; H04N 5/23238;
G06K 9/6269; G06K 9/6256; G06K
9/6267; G06K 9/00; G06K 9/6268; G06K
9/6201; G06K 9/6218; G06K 9/6292;
G06K 9/6272; G06Q 30/0631; G06Q
50/01; G06Q 30/0643; G06Q 30/0282;
G06Q 30/06; G06Q 30/0277; G06Q
30/0281; G06Q 30/0627; G06Q 30/0253;
G06Q 30/0254; G06Q 30/0267; G06Q
30/0637; G06N 3/0454; G06N 20/00;
G06N 3/08; G06N 3/04; G06N 3/004;
G06N 3/008; G06N 5/022; G06N 5/003;
H04M 1/72454; H04M 2250/52; H04M
1/72463
See application file for complete search history.

(56) References Cited

U.S. PATENT DOCUMENTS

| | | | | |
|---|---|---|---|---|
| 2010/0316265 | A1* | 12/2010 | Nakanowatari | G06V 40/172 |
| | | | | 382/118 |
| 2011/0235870 | A1 | 9/2011 | Ichikawa et al. | |
| 2012/0027267 | A1* | 2/2012 | Kim | G06F 3/0418 |
| | | | | 382/118 |
| 2013/0227651 | A1* | 8/2013 | Schultz | H04L 63/0861 |
| | | | | 726/4 |
| 2014/0307926 | A1* | 10/2014 | Murakami | G06T 7/20 |
| | | | | 382/107 |
| 2015/0092997 | A1 | 4/2015 | Yamaguchi | |
| 2017/0311863 | A1* | 11/2017 | Matsunaga | A61B 5/165 |

FOREIGN PATENT DOCUMENTS

| | | |
|---|---|---|
| JP | 2007-188321 A | 7/2007 |
| JP | 2010-061528 A | 3/2010 |
| JP | 2011-203992 A | 10/2011 |
| JP | 2015-036895 A | 2/2015 |
| JP | 2015-069495 A | 4/2015 |
| JP | 2015121874 A | 7/2015 |
| JP | 2016526211 A | 9/2016 |
| WO | 2014/186374 A1 | 11/2014 |

\* cited by examiner

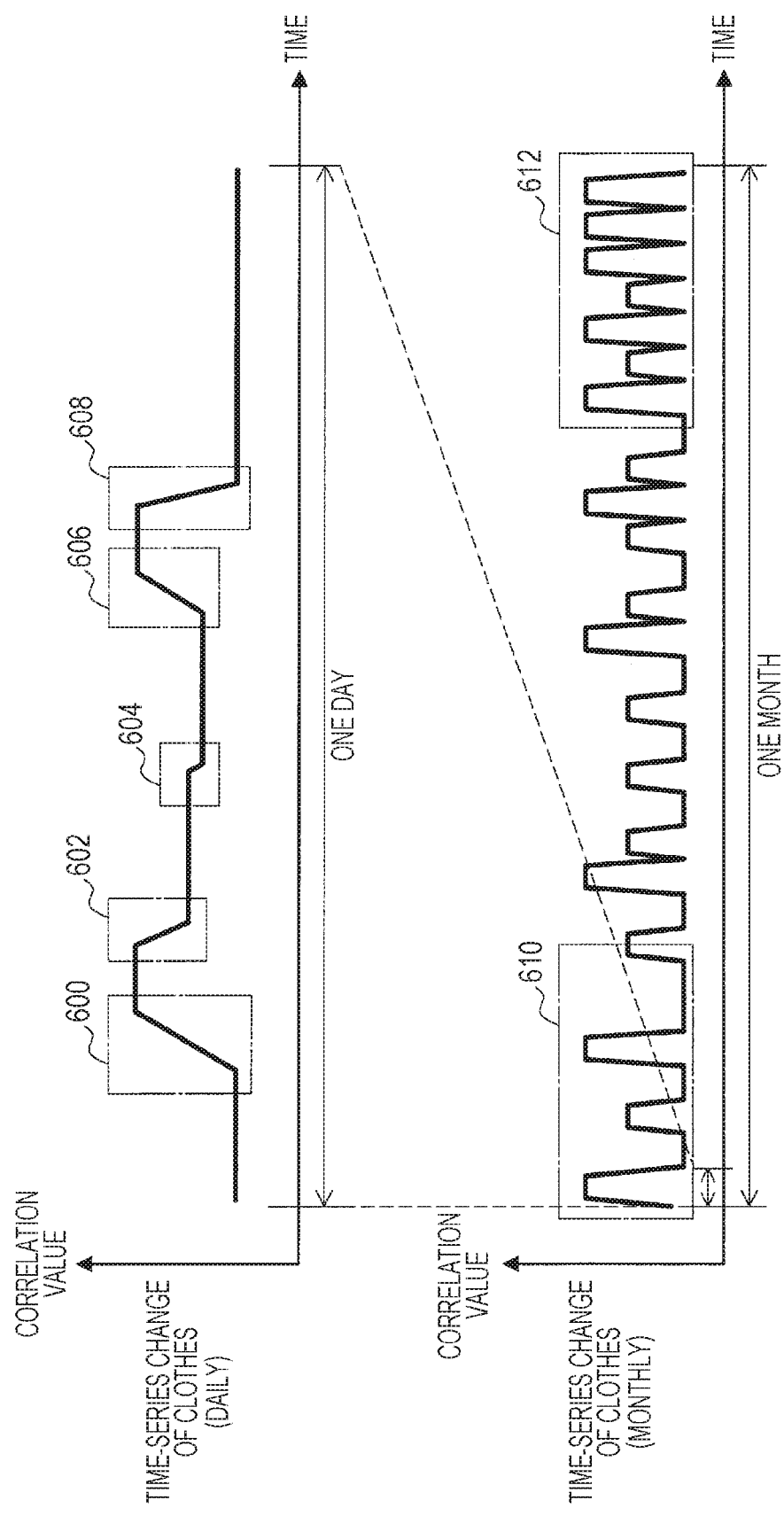

INFORMATION PROCESSING APPARATUS, PROGRAM, AND INFORMATION PROCESSING METHOD

CROSS-REFERENCE TO RELATED APPLICATIONS

The present application is based on PCT filing PCT/JP2018/027365, filed Jul. 20, 2018, which claims priority to JP 2017-216281, filed Nov. 9, 2017, the entire contents of each are incorporated herein by reference.

TECHNICAL FIELD

The present disclosure relates to an information processing apparatus, a program, and an information processing method.

BACKGROUND ART

In recent years, biometric authentication technology has been widely used as a technology for authenticating whether or not a user to be authenticated matches a user who has registered in advance. Such a biometric authentication technology is highly convenient for the user because authentication can be performed even if the user does not memorize a password or the like. As one example thereof, Patent Document 1 discloses a biometric authentication technology that performs access control on the basis of whether or not an image captured and registered in advance matches an image captured at the time of authentication.

CITATION LIST

Patent Document

Patent Document 1: Japanese Patent Application Laid-Open No. 2007-188321

SUMMARY OF THE INVENTION

Problems to be Solved by the Invention

However, in the biometric authentication that reads the characteristics of the face and the iris, the unauthorized collation may be performed using a printed matter or the like in which the same face or iris as the registered image is printed. As a solution for the authentication using a printed matter or the like as described above, an authentication method focusing on motion, for example, a method of using detection of blinking or detection of pupil motion is developed. However, the spread of electronic devices such as smartphones and tablets may allow unauthorized collation to be possible by reproducing the recorded blinking or pupil motion.

Thus, the present disclosure provides a novel and improved information processing apparatus, program, and information processing method, capable of preventing unauthorized collation.

Solutions to Problems

According to the present disclosure, there is provided an information processing apparatus including a data acquisition unit configured to automatically acquire a plurality of user data items to acquire feature data of a user on the basis of a time-series change in the plurality of user data items, a determination unit configured to compare a plurality of the feature data items acquired at different timings to determine whether or not the plurality of feature data items indicates an identical feature of the user, and a control unit configured to control authentication processing on the user depending on a first determination result that is a determination result obtained by the determination unit.

Further, according to the present disclosure, there is provided a program for causing a computer to function as a data acquisition unit configured to automatically acquire a plurality of user data items to acquire feature data of a user on the basis of a time-series change in the plurality of user data items, a determination unit configured to compare a plurality of the feature data items acquired at different timings to determine whether or not the plurality of feature data items indicates an identical feature of the user, and a control unit configured to control authentication processing on the user depending on a first determination result that is a determination result obtained by the determination unit.

Further, according to the present disclosure, there is provided an information processing method executed by a processor, the method including acquiring automatically a plurality of user data items to acquire feature data of a user on the basis of a time-series change in the plurality of user data items, comparing a plurality of the feature data items acquired at different timings to determine whether or not the plurality of feature data items indicates an identical feature of the user, and controlling authentication processing on the user depending on a first determination result that is a determination result obtained by a determination unit.

Effects of the Invention

According to the present disclosure as described above, it is possible to provide a novel and improved information processing apparatus, information processing method, and program, capable of preventing unauthorized collation.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is a diagram illustrated to describe an example of a time-series change in a correlation value of clothes in a modification according to the present embodiment.

MODE FOR CARRYING OUT THE INVENTION

Figure 1:
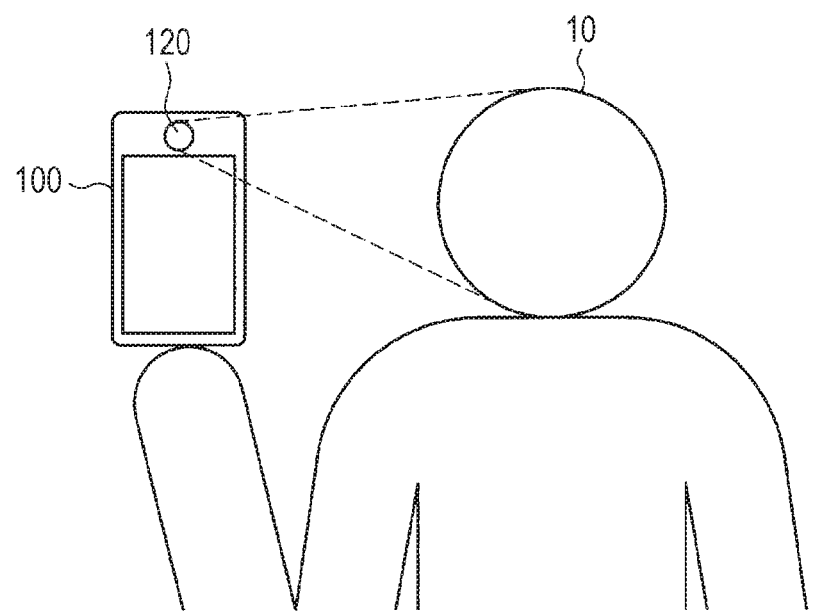
FIG. 1 is a diagram illustrated to describe an overview of an authentication system according to an embodiment of the present disclosure.

Hereinafter, preferred embodiments of the present disclosure will be described in detail with reference to the appended drawings. Note that, in this specification and the appended drawings, components that have substantially the same function and configuration are denoted with the same reference numerals, and repeated explanation of these structural elements is omitted.

Note that the description is given in the following order.
1. Authentication system
2. First Embodiment
2.1. Functional configuration example
2.2. Operation example
2.3. Effect
3. Second Embodiment
3.1. Functional configuration example
3.2. Operation example
3.3. Effect
4. Modifications
5. Application examples
6. Concluding remarks 1. Authentication System FIG. 1 is a diagram illustrated to describe an overview of an authentication system according to an embodiment of the present disclosure. The authentication system is a system for acquiring user data of a user 10 and controlling authentication processing on the basis of the acquired user data. In an embodiment of the present disclosure, an example of a mobile phone 100 in which a program for the authentication system is installed is described. Moreover, in an embodiment of the present disclosure, an authentication program installed in the mobile phone implements the authentication system by cooperating with the components of the mobile phone, but the authentication system is not limited to a particular configuration. For example, this system can be implemented as an authentication device having the authentication program installed therein and independent of other devices. In addition, the authentication program can be installed in the robot.

In FIG. 1, the user 10 directs a depth map acquisition unit 120 (data acquisition unit) included in the mobile phone 100 to the user's own face to cause the mobile phone 100 to automatically acquire user data, but a way to acquire the user data is not limited to a particular method. For example, even if the user 10 does not intentionally face the depth map acquisition unit 120 toward the user 10, the depth map acquisition unit 120 can acquire automatically the user data in a case where the depth map acquisition unit 120 is capable of detecting the user 10.

Further, for example, in a case of using an authentication device independent of the other devices described above, the user 10 can cause the authentication device, instead of the mobile phone 100, to acquire the user data. Specifically, an external device, which is installed on a wall or the like of a room, can automatically acquire the user data. The external device, when detecting the user, automatically acquires the user data without involving the operation of the user 10 and transmits the acquired user data to the mobile phone 100. The mobile phone 100 is capable of performing the authentication processing on the basis of the user data automatically acquired by the external device.

The overview of the authentication system is described above with reference to FIG. 1. Then, a first embodiment is described.

2. First Embodiment

In the first embodiment, an example is described in which a mobile phone having an authentication program installed and provided with a depth map acquisition unit for acquiring user data is used. A functional configuration example of a mobile phone according to the first embodiment of the present disclosure is now described with reference to FIG. 2.

2.1. Functional Configuration Example

[2.1.1. Functional Configuration Example of Mobile Phone 100-1]

Figure 2:
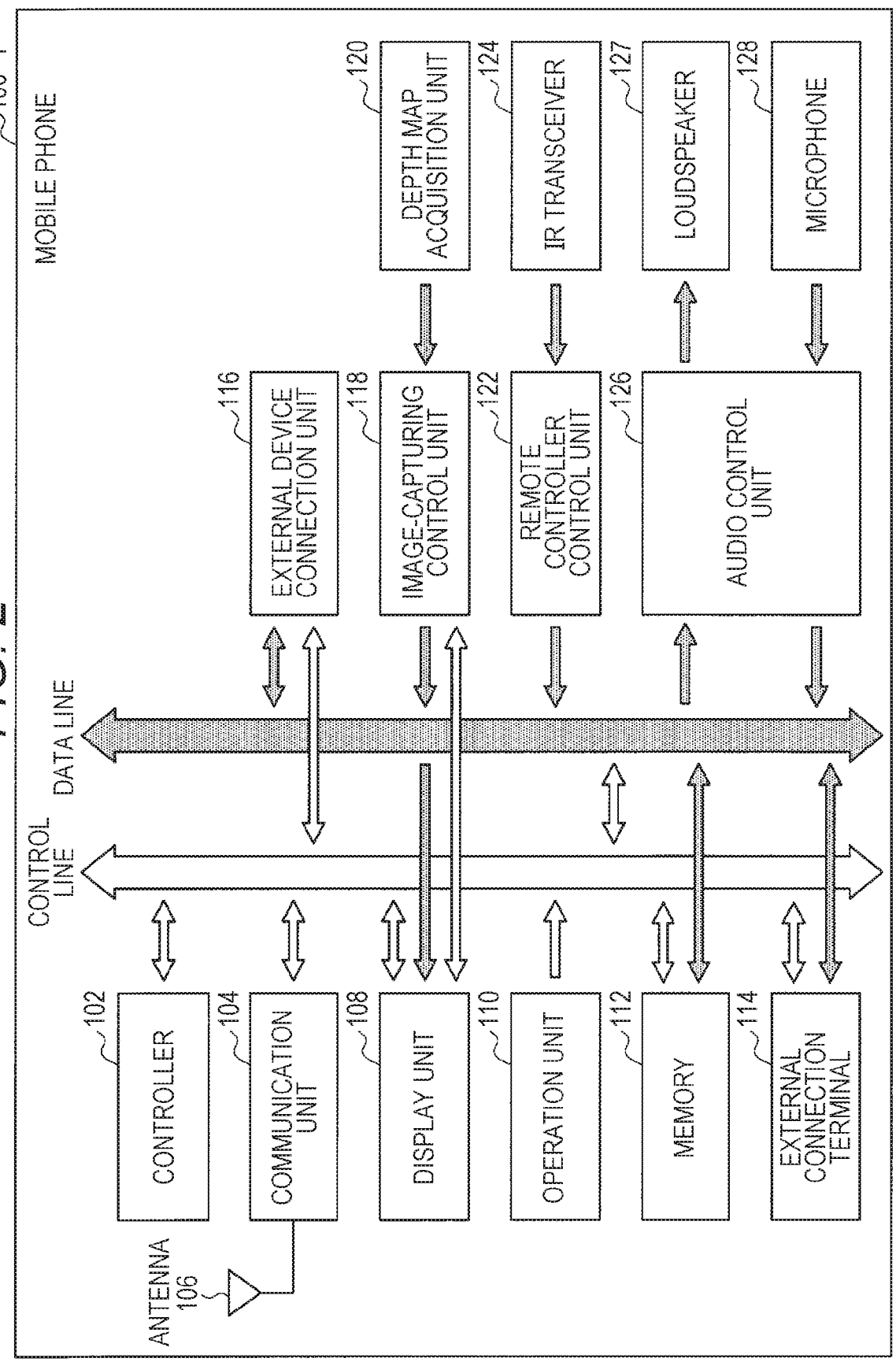
FIG. 2 is a block diagram illustrating a functional configuration example of a mobile phone according to the present embodiment.

FIG. 2 is a block diagram illustrating a functional configuration example of a mobile phone 100-1 having the authentication program installed. The functional configuration example of the mobile phone 100-1 is now described with reference to FIG. 2.

As illustrated in FIG. 2, the mobile phone 100-1 includes a controller 102, a communication unit 104, an antenna 106, a display unit 108, an operation unit 110, a memory 112, an external connection terminal 114, an external device connection unit 116, and an image-capturing control unit 118, a depth map acquisition unit 120, a remote controller control unit 122, an IR transceiver 124, an audio control unit 126, a loudspeaker 127, and a microphone 128.

(1) Controller 102

The controller 102 has a function of controlling the functions of the respective components of the mobile phone 100-1 via a control line. In addition, the controller 102 can control the function of each component of the mobile phone 100-1 by reading out a program (software) stored in the memory 112 via the control line and executing the readout program. For example, in an embodiment of the present disclosure, the controller 102 executes an authentication program stored in the memory 112 to perform the control of depth map data acquisition processing in the depth map acquisition unit 120, the control of extraction processing of feature data of the user 10, the control of determination processing based on the feature data of the user 10, and the control of authentication processing based on the determination result. In addition, the controller 102 includes, for example, a central processing unit (CPU) and the like. Moreover, the controller 102 can have a function of a detection unit configured to detect the start of the authentication processing.

(2) Communication Unit 104 and Antenna 106

The communication unit 104 has a function of performing wireless signal transmission and reception processing under the control of the controller 102. In addition, the mobile phone 100-1 includes an antenna 106 for performing wireless communication with a base station, and the antenna 106 is connected to the communication unit 104.

Further, in a case where the mobile phone 100-1 performs data communication or email transmission and reception via a network such as the Internet, the communication unit 104 can perform transmission and reception processing under the control of the controller 102. For example, the data received by the communication unit 104 is stored in the memory 112, and processing such as display based on the stored data is performed under the control of the controller 102. In addition, the data stored in the memory 112 is supplied to the communication unit 104 for wireless transmission.

(3) Display Unit 108 and Operation Unit 110

The display unit 108 has a function of displaying various display screens such as a home screen and a lock screen on a display panel under the control of the controller 102. Examples of the display panel to be used include a liquid crystal display panel or an organic electro-luminescence (EL) display panel. In addition, the mobile phone 100-1 includes, as the operation unit 110, an operation key, a power switch, and the like. The information regarding operations on the operation key is transferred to the controller 102.

Moreover, the use of a touchscreen panel for the display unit 108 of the mobile phone 100-1 allows the display unit 108 to function as the operation unit 110. The touchscreen panel detects, upon touching a surface (detection surface) of the display panel with an object such as a human finger or a pen, the location of the contact. For example, the touchscreen panel detects the contact of a human finger or a pen to an area or the like of an image or the like displayed on the display panel. Moreover, the touchscreen panel can be configured to be arranged on the display panel in a stacked manner or integrally with the display panel. The touchscreen panel can be, for example, a capacitive touchscreen panel, and in this case, the contact of the surface of the display panel with a human finger or the like is detected by a change in capacitance.

The data indicating the location of the contact detected by the touchscreen panel is transferred to the controller 102. The controller 102 runs an activated application on the basis of the supplied location of the contact. The location of the contact is indicated by the coordinate position of two orthogonal axes, for example, an X-axis (horizontal axis) and a Y-axis (vertical axis). The coordinate position detected by the touchscreen panel is not limited to one point. In a case where a plurality of points is in contact at the same time, the controller 102 performs the control based on the plurality of detected points. Further, the controller 102, in a case where the touchscreen panel is in contact at the same time over a wide range, detects the entire range being in contact.

(4) Memory 112

The memory 112 has a function of storing data prepared in advance, such as a program. For example, the authentication program is stored in the memory 112. In addition, the memory 112 stores data generated by the operation of the user 10. The storage of data in the memory 112 and the readout of data from the memory 112 are performed under the control of the controller 102.

(5) External Device Connection Unit 116 and External Connection Terminal 114

The external device connection unit 116 is a component that connects the mobile phone 100-1 to an external device, and the mobile phone 100-1 is provided with a plurality of external device connection units 116. Furthermore, the external device connection unit 116 is provided with an external connection terminal 114 that is an electrical connector used to connect the main body of the mobile phone 100-1 to other devices. The mobile phone 100-1 and an external device are connected to each other using an electrical cable or the like compatible with the external device, and the electrical cable or the like is connected to the external connection terminal 114 provided in the external device connection unit 116. For example, in connecting the mobile phone 100-1 to a personal computer (PC) to exchange data, the external connection terminal 114 is connected to a universal serial bus (USB) port of the PC by using a USB cable.

(6) Image-Capturing Control Unit 118

The image-capturing control unit 118 has a function of controlling the operation of the depth map acquisition unit 120 in accordance with an instruction from the controller 102. For example, the image-capturing control unit 118, in a case of receiving an instruction to acquire an image from the controller 102, activates the depth map acquisition unit 120 and causes the depth map acquisition unit 120 to acquire an image. Then, the image-capturing control unit 118 outputs the image acquired by the depth map acquisition unit 120 to the controller 102 via a data line and the control line. Moreover, the image-capturing control unit 118 can store the image acquired by the depth map acquisition unit 120 in the memory 112 via the data line in such a way that the controller 102 is capable of accessing the image.

(7) Depth Map Acquisition Unit 120

The depth map acquisition unit 120 has a function of imaging the user 10 using a camera capable of measuring the shape of a target. The depth map acquisition unit 120 acquires a plurality of depth map data items of the user 10 by continuously imaging the user 10 in accordance with an instruction from the controller 102. Then, the plurality of depth map data items imaged by the depth map acquisition unit 120 is output to the controller 102.

The depth map data acquired by the depth map acquisition unit 120 includes image data that the user 10 is captured and depth data (shape data) indicating the distance to the user 10. Moreover, the number of times that the depth map acquisition unit 120 continuously images the user 10 is not limited to a particular number of times and can be set to any number of times. In addition, the shape data acquired by the depth map acquisition unit 120 is not limited to depth data, and the depth map acquisition unit 120 can acquire any type of shape data.

Moreover, the type of a depth map acquisition device used by the depth map acquisition unit 120 is not limited to a particular type, and any depth map acquisition device can be used. For example, the depth map acquisition unit 120 can use a stereo camera and a polarization camera, as a depth map acquisition device. In addition, a way to measure the shape of an imaging subject that is used by the depth map acquisition unit 120 is not limited to a particular method, and any method can be used. For example, the depth map acquisition unit 120 can employ a structured light technique and a time-of-flight (ToF) technique.

(8) IR Transceiver 124 and Remote Controller Control Unit 122

The infrared (IR) transceiver 124 has a function of transmitting or receiving an infrared signal to or from other mobile phones or the like. For example, the IR transceiver 124 outputs an infrared signal received from the outside to the remote controller control unit 122. The remote controller control unit 122 analyzes the infrared signal and outputs an analyzed result to the controller 102 via the data line. The controller 102 controls the processing of the function of each component of the mobile phone 100-1 on the basis of the analysis result of the infrared signal. Moreover, the type of a signal transmitted or received by IR transceiver 124 is not limited to a particular type.

(9) Audio Control Unit 126, Loudspeaker 127, and Microphone 128

The audio control unit 126 performs demodulation processing on the supplied audio data to obtain an analog audio signal. The audio data supplied to the audio control unit 126 can be audio data for calls received by the communication unit 104. In this case, the communication unit 104 supplies the audio data to the audio control unit 126 via the data line. The analog audio signal obtained by the audio control unit 126 is supplied to the loudspeaker 127 for outputting sound from the loudspeaker 127.

Further, the audio control unit 126 converts the audio signal output from the microphone 128 into audio data in a transmission format. Then, the audio data converted by the audio control unit 126 is supplied to the communication unit 104 via the data line. In addition, the audio data supplied to the communication unit 104 is packetized and wirelessly transmitted.

The functional configuration example of the mobile phone 100-1 is described above with reference to FIG. 2. Then, a functional configuration example of a mobile phone 200 of a comparative example is described.

[2.1.2. Example of Mobile Phone 200 in Comparative Example]

Figure 3:
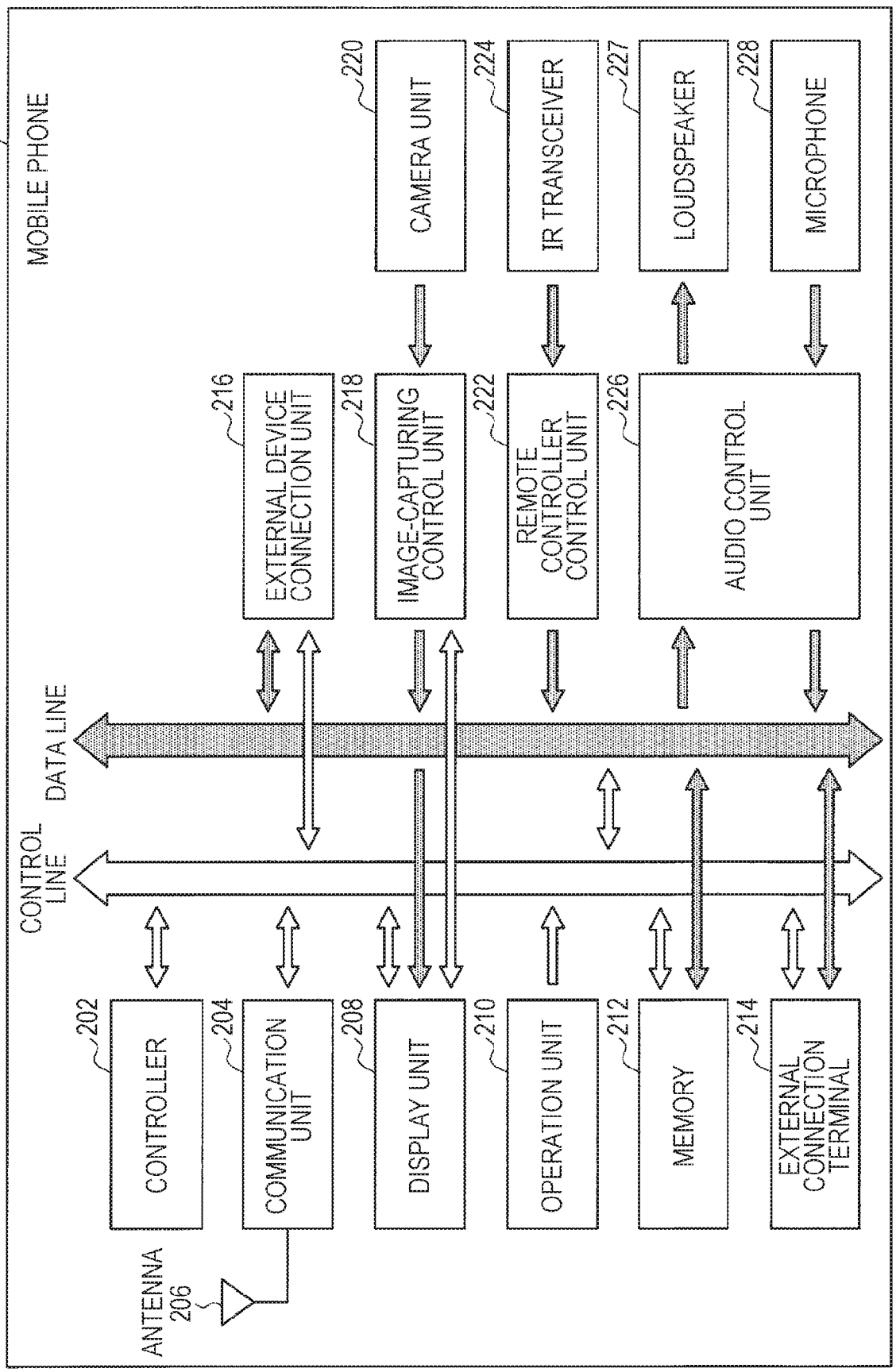
FIG. 3 is a block diagram illustrating a functional configuration example of a mobile phone in a comparative example according to the present embodiment.

FIG. 3 is a block diagram illustrating a functional configuration example of a mobile phone 200 in the comparative example. The functional configuration example of the mobile phone 200 in the comparative example is now described with reference to FIG. 3. Moreover, only the difference between the functional configuration examples of the mobile phone 200 and the mobile phone 100-1 is described below to avoid redundancy in description.

In the comparative example, there are two points in which the functional configuration example of the mobile phone 200 is different from that of the mobile phone 100-1. First, the first point is that a camera unit 220 is provided instead of the depth map acquisition unit. A controller 202 of the mobile phone 200 is capable of acquiring only image data from an image captured by the camera unit and does not have a function of acquiring shape data such as depth data, unlike the depth map acquisition unit. The second point is that the difference in the processing in the controller 202. Specifically, the controller 202 is sufficient only to be able to extract feature data from one image data item, so the controller 202 does not have a function of extracting feature data such as shape data from depth map data as in the case of the controller 102 and a function of extracting feature data based on a time-series change in a plurality of images.

Moreover, the other components of the mobile phone 200 have the same functions as the components of the mobile phone 100-1 having the same component names except for the reference numerals, and so detailed description of the functions is omitted to avoid redundancy in description.

The functional configuration example of the mobile phone 200 in the comparative example is described above with reference to FIG. 3. As described above, the controller 202 of the mobile phone 200 in the comparative example, unlike the controller 102, does not have a function of extracting feature data such as shape data from depth map data and a function of extracting feature data based on a time-series change in a plurality of images. Thus, the mobile phone 200 in the comparative example is incapable of extracting the feature data such as shape data, so it fails to recognize a three-dimensional object, which will cause unauthorized collation to occur using an image, moving image, print matter, or the like indicating the feature data.

Further, the mobile phone 200 is incapable of extracting feature data such as a change in motion based on a time-series change, so it is not possible to distinguish between a person and an artificially created three-dimensional object, resulting in the occurrence of unauthorized collation caused by a three-dimensional object created by a 3D printer or the like.

Thus, the use of the mobile phone 100-1 makes it possible to prevent the above-mentioned unauthorized collation. Specifically, the controller 102 controls the authentication processing on the basis of the depth map data acquired by the depth map acquisition unit 120, so that the mobile phone 100-1 is capable of preventing the unauthorized collation. A detailed functional configuration example of the controller 102 is now described.

[2.1.3. Functional Configuration Example of Controller 102]

Figure 4:
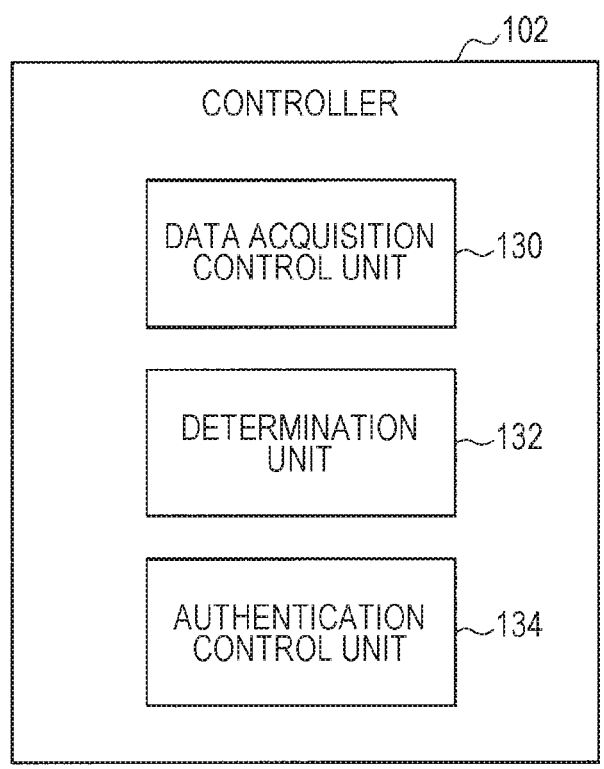
FIG. 4 is a block diagram illustrating a functional configuration example of a controller of the mobile phone according to the present embodiment.

FIG. 4 is a block diagram illustrating a functional configuration example of the controller 102 of the mobile phone 100-1. The functional configuration example of the controller 102 of the mobile phone 100-1 is now described with reference to FIG. 4.

As illustrated in FIG. 4, the controller 102 of the mobile phone 100-1 includes a data acquisition control unit 130, a determination unit 132, and an authentication control unit 134.

Data Acquisition Control Unit 130

The data acquisition control unit 130 has a function of controlling the operation of the depth map acquisition unit 120 and extracting feature data of the user 10 from the plurality of depth map data items acquired by the depth map acquisition unit 120. The operation of the depth map acquisition unit 120 is controlled so that the depth map acquisition unit 120 is activated and the depth map acquisition unit 120 acquires the depth map data of the user 10 when the data acquisition control unit 130 detects registration processing and collation processing based on the operation of the user 10.

The feature data of the user 10 is extracted in such a way that a change in the motion of the user 10 is extracted as feature data on the basis of a time-series change in the depth data included in the plurality of depth map data items acquired by the depth map acquisition unit 120. Moreover, the data acquisition control unit 130 outputs the feature data extracted at the time of the registration processing (first feature data) to the memory 112 and outputs the feature data extracted at the time of the collation processing (second feature data) to the determination unit 132.

Examples of the change in motion of the user 10 that is extracted as the feature data by the data acquisition control unit 130 include a change in face's motion, mouth's motion, eyes' motion, neck's motion, hair's motion, and the like. In addition, the data acquisition control unit 130 can extract, as feature data, not only a change in motion but also a change in the facial color, emotion, or the like caused by a change in physical condition and emotion. Furthermore, for example, in a case where it is possible to acquire information regarding to the entire body of the user 10, the data acquisition control unit 130 can also extract, as the feature data, for example, the gesture of the hand, the way of walking, and the action, or the like. Moreover, the target from which the data acquisition control unit 130 extracts the feature data is not limited to a person, and the motion of a robot, which is an artificial object, the motion of accessories of the user 10, and the like can be the target of the feature data.

Further, in a case where the depth map acquisition unit 120 uses an RGB camera, the data acquisition control unit 130 is capable of identifying a color, so it is possible to extract not only a change in the motion but also a change in the facial color (makeup) of the user 10 and a change in clothes (such as prevention, glasses, tie, and jacket) as feature data on the basis of the change in color.

Determination Unit 132

The determination unit 132 has a function of comparing the first feature data acquired at the time of the registration processing with the second feature data acquired at the time of the collation processing and determining whether or not the two features are the same features of the user 10. Specifically, the determination unit 132 calculates a correlation value between the first feature data and the second feature data and determines whether or not the two features are the same on the basis of whether or not the calculated correlation value is larger than a predetermined threshold value. The determination unit 132 determines that the two features are the same if the correlation value is larger than the threshold value as a result of comparing the correlation value with the threshold value, and determines that the two features are not the same if the correlation value is not larger than the threshold value. Moreover, the way to calculate the correlation value is not limited to a particular method and it can be calculated by any method. In addition, the value to be set as the threshold value is not limited to a particular value and it can be set as any value.

Authentication Control Unit 134

The authentication control unit 134 has a function of controlling the operation of the mobile phone 100-1 on the basis of the determination result in the determination unit 132. Specifically, the authentication control unit 134 controls the operation of the mobile phone 100-1 on the basis of a first determination result that is a determination result based on the feature data of the depth map data. For example, in a case where the first determination result is a determination result indicating a fact that the features of the first feature data and the second feature data are the same, the authentication control unit 134 unlocks the mobile phone 100-1, thereby making the mobile phone 100-1 usable. In addition, for example, in a case where the first determination result is a determination result indicating a fact that the features of the first feature data and the second feature data are not the same, the authentication control unit 134 can leave the mobile phone 100-1 locked, thereby leaving the mobile phone 100-1 unusable.

The functional configuration example of the mobile phone 100-1 is described above with reference to FIGS. 2 to 4. Then, an operation example of the mobile phone 100-1 is described.

2.2. Operation Example

[2.2.1. Authentication Processing of the Mobile Phone 100-1]

The registration processing and the collation processing in the authentication processing of the mobile phone 100-1 according to the first embodiment of the present disclosure are described. The registration processing of the mobile phone 100-1 is now described with reference to FIG. 5.

(1) Registration Processing

Figure 5:
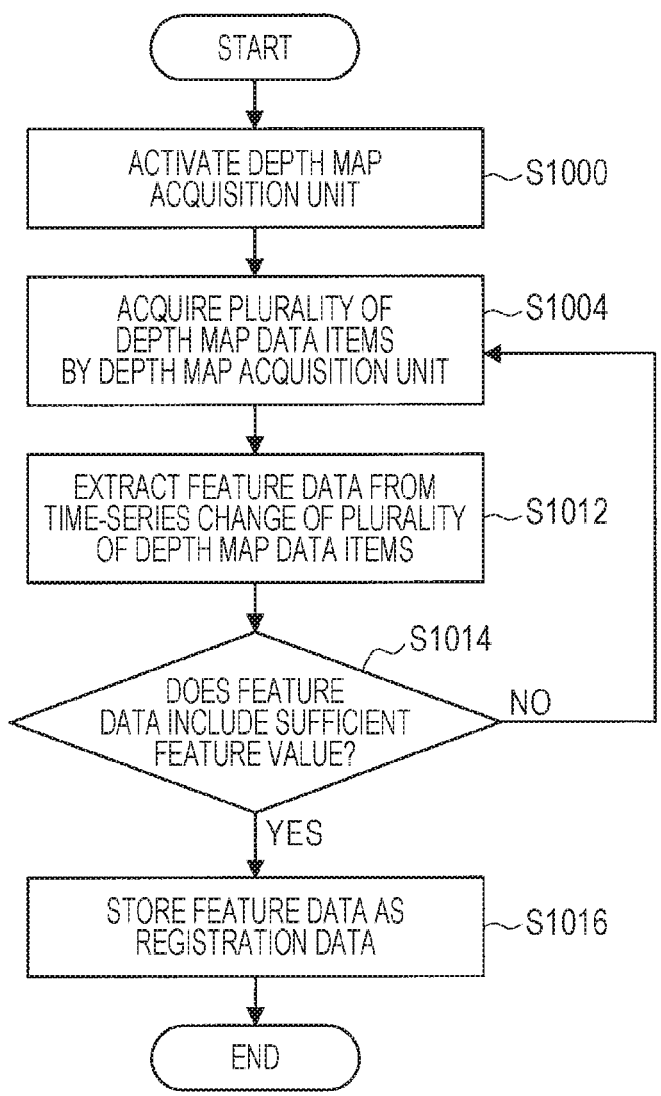
FIG. 5 is a flowchart showing user data registration processing of the mobile phone according to the present embodiment.

FIG. 5 is a flowchart showing the registration processing in the authentication processing of the mobile phone 100-1. The controller 102, first, issues an instruction to the image-capturing control unit 118 so that the image-capturing control unit 118 activates the depth map acquisition unit 120 (step S1000). The depth map acquisition unit 120 images the user 10 a plurality of times and acquires a plurality of depth map data items (step S1004). The image-capturing control unit 118 outputs a plurality of depth map data items acquired by the depth map acquisition unit 120 to the controller 102. The controller 102, when acquiring the plurality of depth map data items, causes the data acquisition control unit 130 to extract feature data indicating the features of the user 10 from a time-series change in the plurality of depth map data items (step S1012). The data acquisition control unit 130 outputs the extracted feature data to the determination unit 132.

The determination unit 132 determines whether or not the feature data includes a sufficient feature value (step S1014). If it is determined in step S1014 that the feature data includes a sufficient feature value, the controller 102 outputs the feature data to the memory 112 as registration data, and stores the registration data in the memory 112 (step S1016). When the memory 112 completes the storage of the registration data, the mobile phone 100-1 terminates the registration processing. Moreover, if it is determined in step S1014 that the feature data does not include a sufficient feature value, the data acquisition control unit 130 causes the depth map acquisition unit 120 to acquire the depth map data again.

The registration processing in the authentication processing of the mobile phone 100-1 is described above with reference to FIG. 5. Then, the collation processing in the authentication processing of the mobile phone 100-1 is now described with reference to FIG. 6.

(2) Collation Processing

Figure 6:
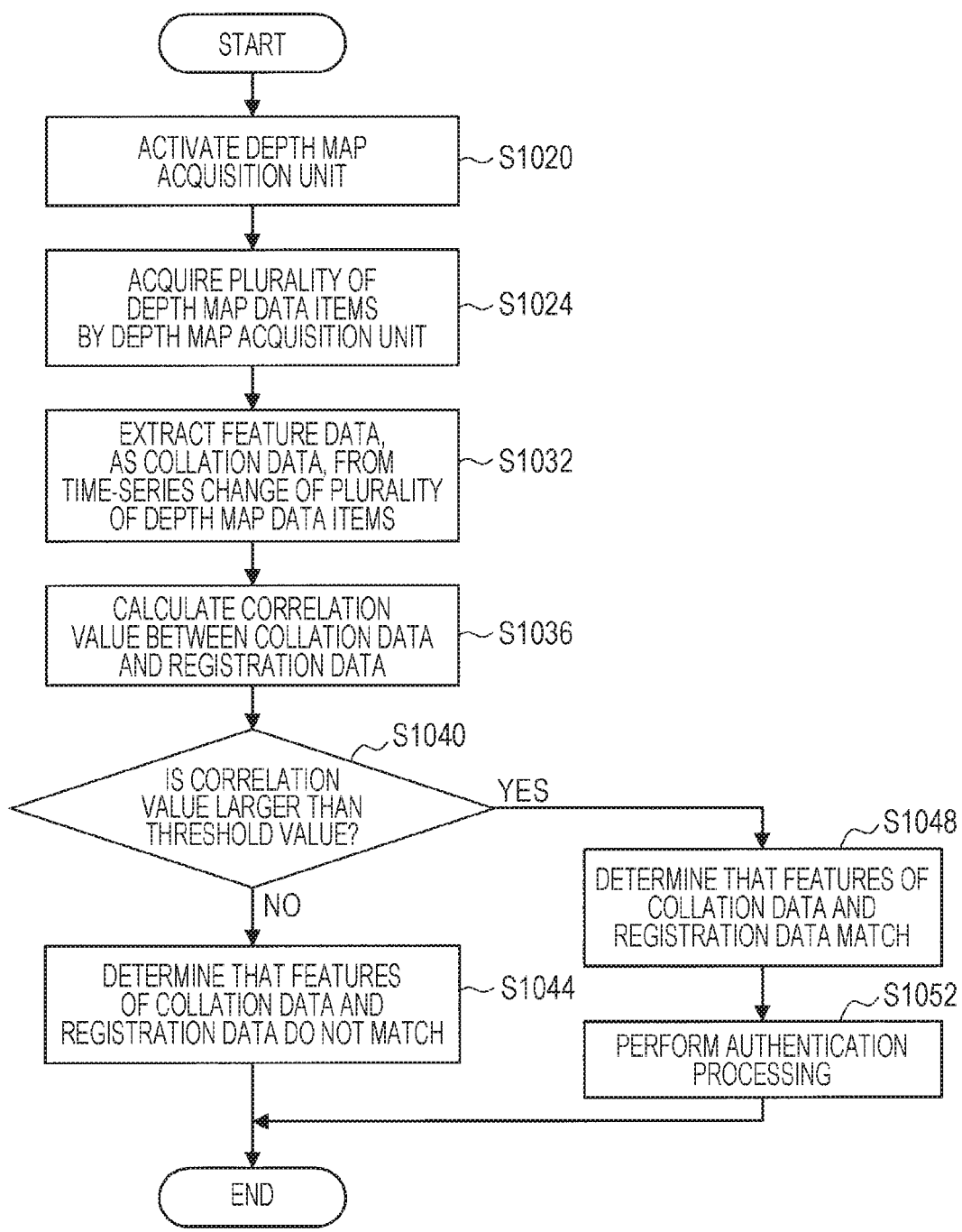
FIG. 6 is a flowchart showing user data collation processing of the mobile phone according to the present embodiment.

FIG. 6 is a flowchart showing the collation processing in the authentication processing of the mobile phone 100-1. The controller 102, first, issues an instruction to the image-capturing control unit 118 so that the image-capturing control unit 118 activates the depth map acquisition unit 120 (step S1020). The depth map acquisition unit 120 images the user 10 a plurality of times and acquires a plurality of depth map data items (step S1024). The image-capturing control unit 118 outputs a plurality of depth map data items acquired by the depth map acquisition unit 120 to the controller 102. The controller 102, when acquiring the plurality of depth map data items, causes the data acquisition control unit 130 to extract feature data indicating the features of the user 10 from a time-series change in the plurality of depth map data items. The data acquisition control unit 130 outputs the extracted feature data to the determination unit 132 as collation data (step S1032).

The determination unit 132, when acquiring the feature data from the data acquisition control unit 130, acquires the registration data from the memory 112. The determination unit 132 calculates the correlation value by comparing the collation data with the registration data (step S1036). The determination unit 132 determines whether or not the calculated correlation value satisfies a predetermined condition (step S1040). If the correlation value is not larger than a threshold value in step S1040, the determination unit 132 determines that the features of the collation data and the registration data do not match, and terminates the processing (step S1044). If it is determined in step S1040 that the correlation value is larger than the predetermined value, the determination unit 132 determines that the features of the collation data and the registration data match (step S1048), and the authentication control unit 134 performs the authentication processing (step S1052). When the authentication control unit 134 completes the authentication processing, the mobile phone 100-1 terminates the collation processing.

The registration processing and the collation processing in the authentication processing of the mobile phone 100-1 are described above with reference to FIGS. 5 and 6. Then, the authentication processing of the mobile phone 200 in the comparative example is described with reference to FIGS. 7 and 8.

[2.2.2. Authentication Processing of the Mobile Phone 200]

The registration processing and the collation processing in the authentication processing of the mobile phone 200 in the comparative example are described. The registration processing in the authentication processing of the mobile phone 200 in the comparative example is now described with reference to FIG. 7.

(1) Registration Processing

Figure 7:
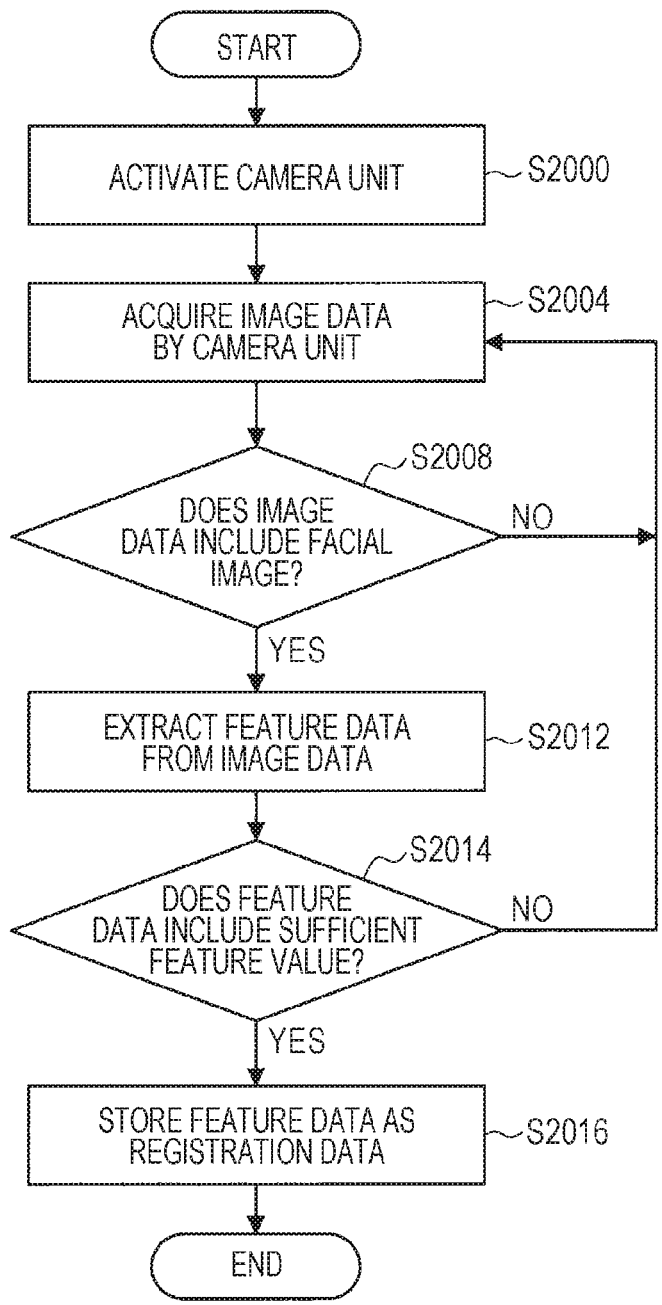
FIG. 7 is a flowchart showing user data registration processing of a mobile phone in a comparative example according to the present embodiment.

FIG. 7 is a flowchart showing the registration processing in the authentication processing of the mobile phone 200. The controller 202, first, issues an instruction to the image-capturing control unit 218 so that the image-capturing control unit 218 activates the camera unit 220 (step S2000). The camera unit 220 images the user 10 and acquires image data (step S2004). The image-capturing control unit 218 outputs the image data acquired by the camera unit 220 to the controller 202. The controller 202, when acquiring the image data, determines whether or not the image data includes a facial image of the user 10 (step S2008). If the controller 202 determines in step S2008 that the image data does not include a facial image, the controller 202 causes the camera unit 220 to acquire the image data again and performs the determination processing. If the controller 202 determines in step S2008 that the image data includes a facial image, the controller 202 extracts feature data from the image data (step S2012). The controller 202 determines whether or not the extracted feature data includes a sufficient feature value (step S2014). If it is determined in step S2014 that the feature data includes a sufficient feature value, the controller 202 outputs the feature data to the memory 212 as registration data, and stores the registration data in the memory 212 (step S2016). When the memory 212 completes the storage of the registration data, the mobile phone 200 terminates the registration processing. Moreover, if it is determined in step S2014 that the feature data does not include a sufficient feature value, the controller 202 causes the camera unit 220 to acquire image data again.

The registration processing in the authentication processing of the mobile phone 200 in the comparative example is described above with reference to FIG. 7. Then, the collation processing in the authentication processing of the mobile phone 200 in the comparative example is now described with reference to FIG. 8.

(2) Collation Processing

Figure 8:
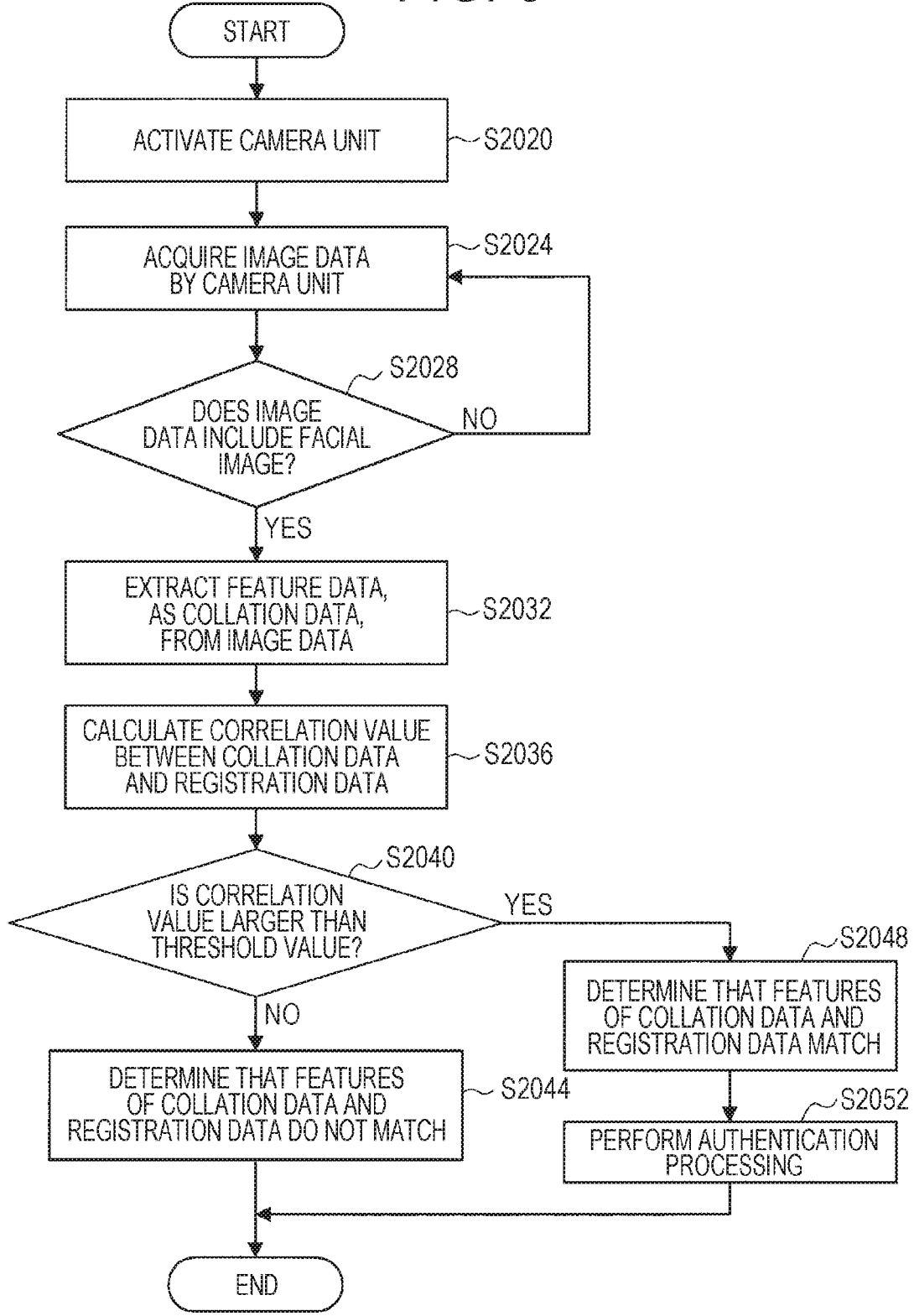
FIG. 8 is a flowchart showing user data collation processing of the mobile phone in the comparative example according to the present embodiment.

FIG. 8 is a flowchart showing the collation processing in the authentication processing of the mobile phone 200. The controller 202, first, issues an instruction to the image-capturing control unit 218 so that the image-capturing control unit 218 activates the camera unit 220 (step S2020). The camera unit 220 images the user 10 and acquires image data (step S2024). The image-capturing control unit 218 outputs the image data acquired by the camera unit 220 to the controller 202. The controller 202, when acquiring the image data, determines whether or not the image data includes a facial image of the user 10 (step S2028). If the controller 202 determines in step S2028 that the image data does not include a facial image, the controller 202 causes the camera unit 220 to acquire the image data again and performs the determination processing. If the controller 202 determines in step S2028 that the image data includes a facial image, the controller 202 extracts feature data from the image data as the collation data (step S2032).

After the acquisition of the collation data, the controller 202 acquires the registration data from the memory 212, and calculates the correlation value by comparing the collation data with the registration data (step S2036). The controller 202 determines whether or not the calculated correlation value satisfies a predetermined threshold (step S2040). If the correlation value is not larger than the predetermined threshold value in step S2040, the controller 202 determines that the features of the collation data and the registration data do not match, and terminates the processing (step S2044). If it is determined in step S2040 that the correlation value is larger than the predetermined threshold, the controller 202 determines that the features of the collation data and the registration data match (step S2048), and the controller 202 performs the authentication processing (step S2052). When the controller 202 completes the authentication processing, the mobile phone 200 terminates the collation processing.

The registration processing and the collation processing in the authentication processing of the mobile phone 200 in the comparative example are described above with reference to FIGS. 7 and 8.

2.3. Effect

As can be seen from the above description, the mobile phone 100-1 is capable of recognizing whether or not a target is a three-dimensional object by using the depth map data including the shape data for collation. Thus, in the case where an image, a moving image, a printed matter, and the like showing the same feature data as the user 10 is used, it is possible to recognize that they are neither a three-dimensional object nor a person, resulting in preventing unauthorized collation.

Further, the mobile phone 100-1 is capable of recognizing a feature due to a change in motion of a target by extracting a change in motion or the like based on a time-series change in a plurality of depth maps as feature data and using the feature data for collation and is capable of distinguishing between a person and an artificially created three-dimensional object by the presence or absence of motion. Thus, even in a case where a user's face model created by a 3D printer or the like is used for collation, it is possible to recognize that the user is a mistaken identity from the fact that there is no change in motion and to prevent unauthorized collation.

The overview of the first embodiment is described above with reference to FIGS. 2 to 8. Subsequently, a second embodiment of the present disclosure is now described.

3. Second Embodiment

In a second embodiment of the present disclosure, an authentication system performs biometric authentication processing using biometric data in addition to the authentication processing using the depth map data according to the first embodiment of the present disclosure. The addition of the biometric authentication processing makes it possible to improve the accuracy in preventing unauthorized collation.

3.1. Functional Configuration Example

Figure 9:
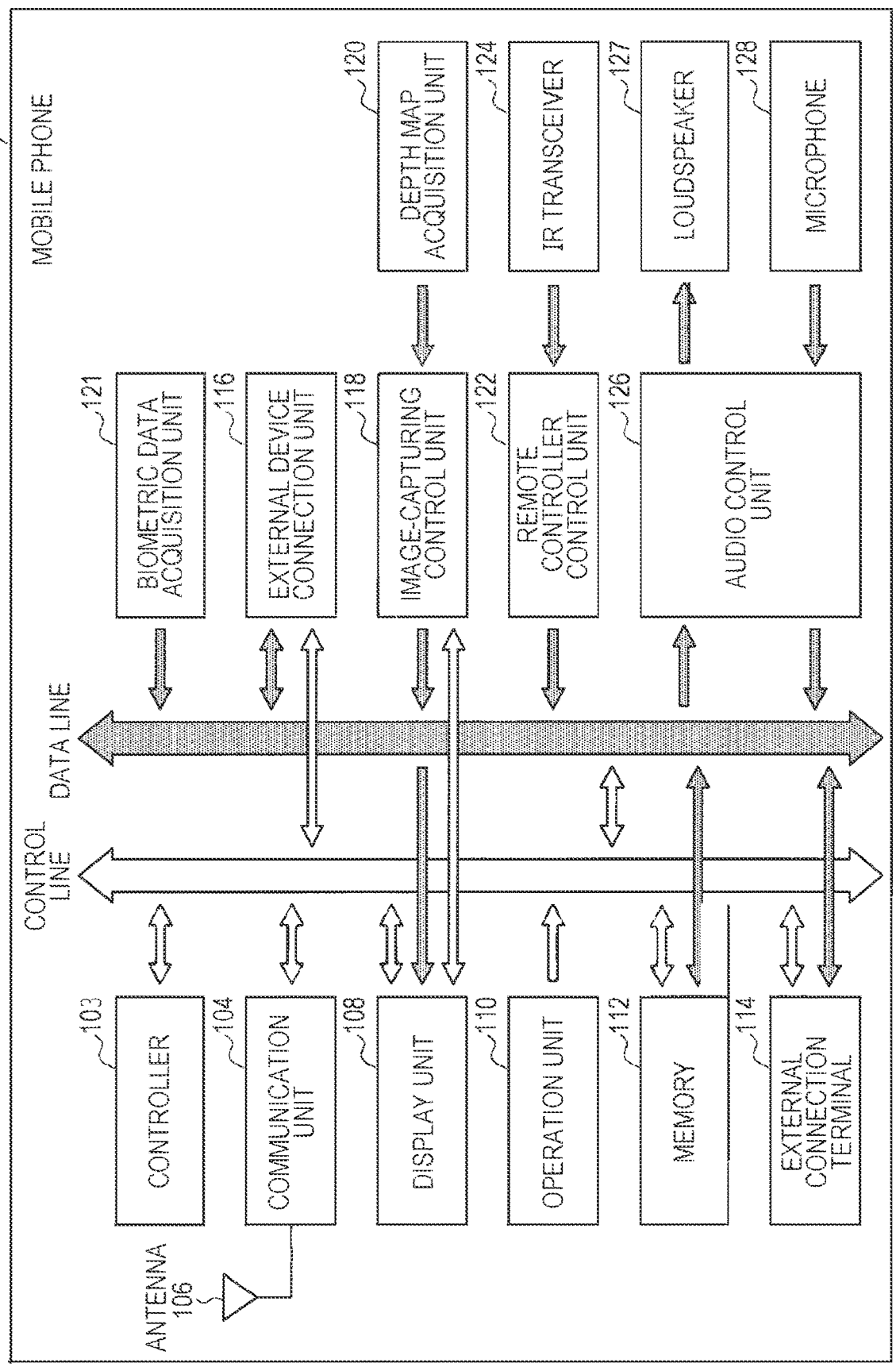
FIG. 9 is a block diagram illustrating a functional configuration example of a mobile phone according to a second embodiment of the present disclosure.

FIG. 9 illustrates a functional configuration example of a mobile phone 100-2 according to the second embodiment of the present disclosure. As illustrated in FIG. 9, the mobile phone 100-2 according to the second embodiment performs additionally biometric authentication processing using biometric data and is additionally provided with a biometric data acquisition unit 121 as compared to the mobile phone 100-1 according to the first embodiment. In addition, the controller 102 of the mobile phone 100-1 is equipped additionally with a function of performing the biometric authentication processing, so the controller 102 is modified with a controller 103.

As can be seen from the above description, the mobile phone 100-1 and the mobile phone 100-2 differ only in the point of the presence or absence of the biometric data acquisition unit 121 and the point that the controller 103 is equipped with an additional function. Only the functions of the biometric data acquisition unit 121 and the controller 103 are described below to avoid duplication with the description in the first embodiment. The description of the other components is the same as the contents described in the subtitle <2.1. Functional configuration example>, and so the description in this chapter is omitted.

[3.1.1. Functional Configuration Example of Mobile Phone 100-2]

(1) Biometric Data Acquisition Unit 121

The biometric data acquisition unit 121 has a function of acquiring biometric data to be used for biometric authentication. The biometric data acquisition unit 121 can acquire, as biometric data, for example, facial authentication data, iris authentication data, voice authentication data, and the like. Moreover, the type of device used for acquiring the biometric data and the type of the biometric data used for biometric authentication are not limited to a particular type, and any type of device and biometric data can be used.

[3.1.2. Functional Configuration Example of Controller 103]

(1) Controller 103

The controller 103 has a function of performing biometric authentication based on the biometric data in addition to the authentication processing based on the depth map data. Moreover, the authentication processing based on the depth map data is the same as the processing described in connection with the controller 102, and so the description thereof is omitted.

Figure 10:
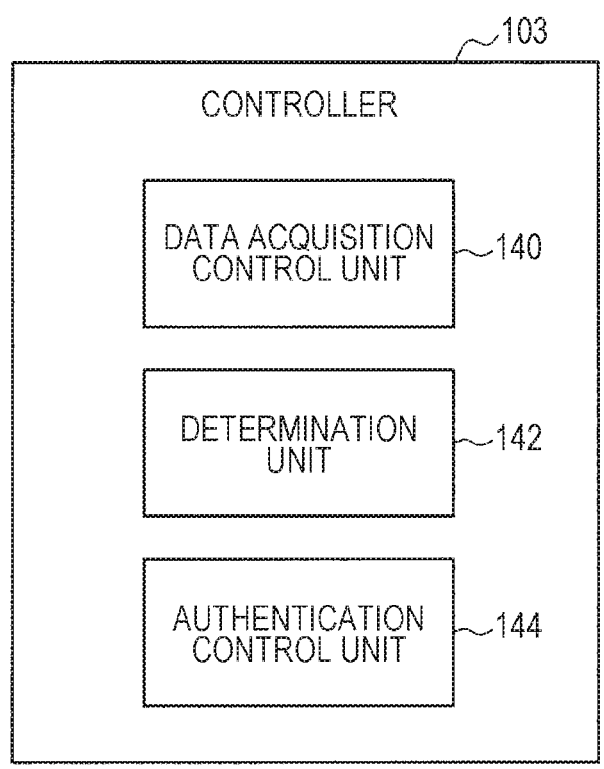
FIG. 10 is a block diagram illustrating a functional configuration example of a controller of the mobile phone according to the present embodiment.

As illustrated in FIG. 10, the controller 103 of the mobile phone 100-2 according to the embodiment of the present disclosure includes a data acquisition control unit 140, a determination unit 142, and an authentication control unit 144.

Data Acquisition Control Unit 140

The data acquisition control unit 140 has a function of controlling the operation of the biometric data acquisition unit 121, in addition to the function of the data acquisition control unit 130. Specifically, when the data acquisition control unit 140 detects the registration processing and the collation processing based on the operation of the user 10, the data acquisition control unit 140 activates the biometric data acquisition unit 121 and causes the biometric data acquisition unit 121 to acquire the biometric data of the user 10.

The data acquisition control unit 140 outputs the biometric data (first biometric data) acquired at the time of the registration processing to the memory 112, and outputs the biometric data (second biometric data) acquired at the time of the collation processing to the determination unit 132.

Determination Unit 142

In addition to the function of the determination unit 132, the determination unit 142 has a function of comparing the first biometric data acquired at the time of the registration processing with the second biometric data acquired at the time of the collation processing and determining whether or not the features that two biometric data indicate are the same features of the user 10. Specifically, the determination unit 142 calculates a correlation value between the first biometric data and the second biometric data and determines whether or not the two biometric data are the same on the basis of whether or not the calculated correlation value is larger than a predetermined threshold value. The determination unit 142 determines that the two features are the same if the correlation value is larger than the threshold value as a result of comparing the correlation value with the threshold value, and determines that the two features are not the same if the correlation value is not larger than the threshold value. Moreover, the way to calculate the correlation value is not limited to a particular method and it can be calculated by any method. In addition, the value to be set as the threshold value is not limited to a particular value and it can be set as any value.

Authentication Control Unit 144

The authentication control unit 144 has a function of controlling the operation of the mobile phone 100-2 on the basis of the determination result in the determination unit 142. Specifically, the authentication control unit 144 controls the operation of the mobile phone 100-2 on the basis of a first determination result that is a determination result based on the feature data of the depth map data and a second determination result that is a determination result based on the biometric data. For example, in a case where both of the first determination result and the second determination result are a determination result indicating a fact that the features of the first biometric data and the second biometric data are the same, the authentication control unit 144 unlocks the mobile phone 100-2, thereby making the mobile phone 100-2 usable. In addition, for example, in a case where any one of the first determination result or the second determination result is a determination result indicating a fact that the features of the first biometric data and the second biometric data are not the same, the authentication control unit 144 can leave the mobile phone 100-2 locked, thereby leaving the mobile phone 100-2 unusable.

3.2. Operation Example

[3.2.1. Authentication Processing of the Mobile Phone 100-2]

The registration processing and the collation processing in the authentication processing of the mobile phone 100-2 according to the second embodiment of the present disclosure are described. The registration processing in the authentication processing of the mobile phone 100-2 is now described with reference to FIG. 11.

(1) Registration Processing

Figure 11:
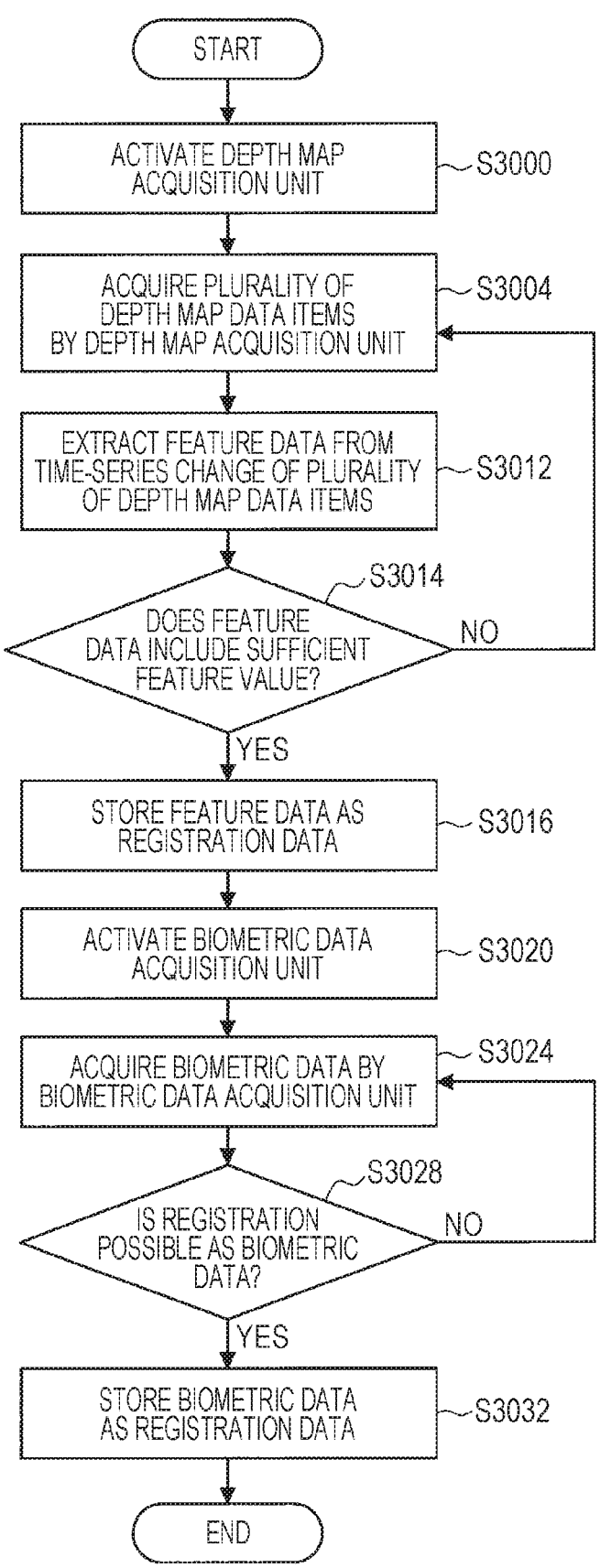
FIG. 11 is a flowchart showing user data registration processing of the mobile phone according to the present embodiment.

FIG. 11 is a flowchart showing the registration processing in the authentication processing of the mobile phone 100-2. Moreover, the contents of the processing of steps S3000, S3004, S3012, S3014, and S3016 shown in FIG. 11 are the same as the contents of the processing of steps S1000, S1004, S1012, S1014, and S1016 shown in FIG. 5, respectively. Thus, the description thereof is omitted, and the description is given from step S3020.

The mobile phone 100-2, after acquiring registration data based on a plurality of depth map data items in steps S3000, S3004, S3012, S3014, and S3016, acquires the biometric data in the processing in step S3020 and the subsequent steps. Specifically, after storing the registration data in step S3016, the controller 103 activates the biometric data acquisition unit 121 (step S3020). The biometric data acquisition unit 121 acquires the biometric data of the user 10 (step S3024). The biometric data acquisition unit 121 outputs the acquired biometric data to the controller 103.

The controller 103, when acquiring the biometric data, determines whether or not the acquired biometric data is possible to be registered as biometric authentication data in the data acquisition control unit 140 (step S3028). If it is determined in step S3028 that the biometric data is possible to be registered, the data acquisition control unit 140 outputs the biometric data to the memory 112 as registration data and stores the registration data in the memory 112 (step S3032). When the memory 112 completes the storage of the registration data, the mobile phone 100-2 terminates the registration processing. Moreover, if it is determined in step S3028 that the biometric data is not possible to be registered, the data acquisition control unit 140 causes the biometric data acquisition unit 121 to acquire biometric data again.

The registration processing in the authentication processing of the mobile phone 100-2 according to the second embodiment is described above with reference to FIG. 11. Then, the collation processing in the authentication processing of the mobile phone 100-2 according to the second embodiment is now described with reference to FIG. 12.

(2) Collation Processing

Figure 12:
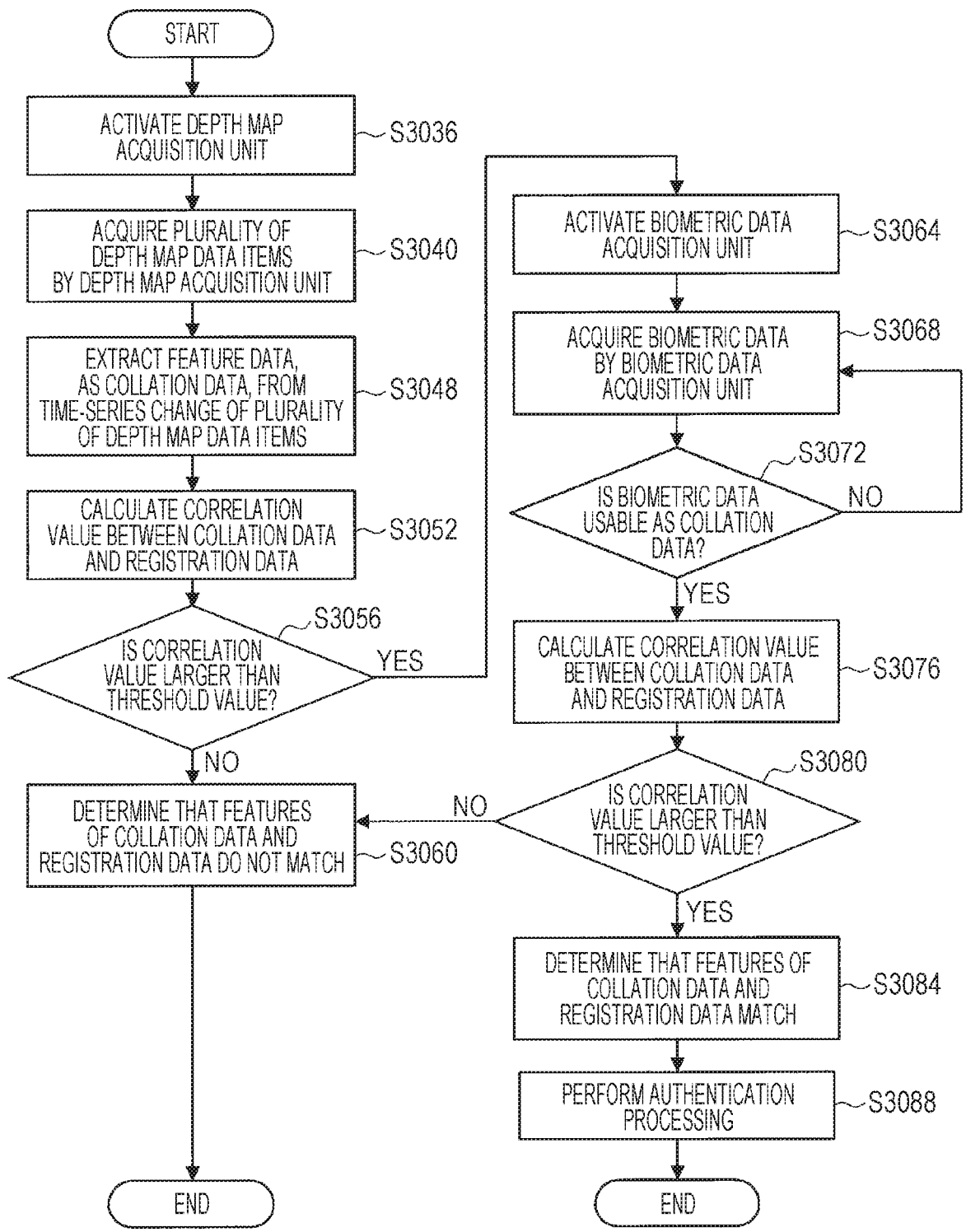
FIG. 12 is a flowchart showing user data collation processing of the mobile phone according to the present embodiment.

FIG. 12 is a flowchart showing the collation processing in the authentication processing of the mobile phone 100-2. Moreover, the contents of the processing of steps S3036, S3040, S3048, S3052, S3056, and S3060 shown in FIG. 12 are the same as the contents of the processing of steps S1020, S1024, S1032, S1036, S1040, and S1044 shown in FIG. 6, respectively. Thus, the description thereof is omitted, and the description is given from step S3064.

If it is determined in step S3060 that the correlation value is larger than the threshold value and the registration data and the collation data based on the plurality of depth map data items match, the mobile phone 100-2 performs the biometric authentication processing using the biometric data in the processing of step S3064 and the subsequent steps. Specifically, in step S3060, after acquiring a determination result indicating a fact that the registration data and the collation data based on the plurality of depth map data items match, the controller 103 activates the biometric data acquisition unit 121 (step S3064). The biometric data acquisition unit 121 acquires the biometric data of the user 10 (step S3068). The biometric data acquisition unit 121 outputs the acquired biometric data to the controller 103.

The controller 103, when acquiring the biometric data, determines whether or not the acquired biometric data is usable as collation data in the data acquisition control unit 140 (step S3072). If the acquired biometric data is unusable as the collation data in step S3072, the controller 103 causes the biometric data acquisition unit 121 to acquire the biometric data again. If the acquired biometric data is usable as the collation data in step S3072, the determination unit 142 compares the collation data with the registration data to calculate a correlation value (step S3076).

The determination unit 142 determines whether or not the calculated correlation value satisfies a predetermined condition (step S3080). If the correlation value is not larger than a threshold value in step S3080, the determination unit 142 determines that the features of the collation data and the registration data do not match, and terminates the processing (step S3060). If it is determined in step S3080 that the correlation value is larger than the predetermined value, the determination unit 142 determines that the features of the collation data and the registration data match (step S3084), and the authentication control unit 144 performs the authentication processing (step S3088). When the authentication control unit 144 completes the authentication processing, the mobile phone 100-2 terminates the collation processing.

The registration processing and the collation processing in the mobile phone 100-2 according to the second embodiment of the present disclosure are described above with reference to FIGS. 11 and 12.

3.3. Effect

As can be seen from the above description, the mobile phone 100-2 is capable of improving the accuracy in the authentication processing in addition to the prevention of unauthorized collation that is the effect of the mobile phone 100-1 according to the first embodiment.

The second embodiment of the present disclosure is described above with reference to FIGS. 9 to 12. Then, modifications according to an embodiment of the present disclosure are described.

4. Modifications

Modifications according to an embodiment of the present disclosure are now described. Moreover, the modifications described below can be applied to the embodiment of the present disclosure alone or can be applied to the embodiment of the present disclosure in combination. In addition, the modifications can be applied instead of the configuration described in the embodiment of the present disclosure or can be additionally applied to the configuration described in the embodiment of the present disclosure.

(First Modification)

A modification relating to the correlation value is now described. The correlation value between the first feature data and the second feature data differs significantly in some cases depending on the acquisition timing of the second feature data even if the correlation value is with respect to the same first feature data. Thus, the determination unit 132 can perform the collation using the integrated feature value by considering the correlation values of a plurality of feature data items instead of considering only the correlation value relating to one feature data item. Consequently, the determination unit 132 is also capable of lowering the false acceptance rate (FAR) that is the ratio at which another person who is trying the authentication is erroneously identified as the authorized person. For example, in the case of considering the correlation value of each of the facial shape feature data shown in FIG. 13 and the facial color feature data shown in FIG. 14, if any one of the correlation values is larger than a predetermined threshold value, it can be determined that the person is the authorized person.

A specific example of the timing at which the correlation values are significantly different is now described with reference to FIGS. 13 and 14. In each graph shown in FIGS. 13 and 14, the upper part shows the time-series change in the correlation values of the feature data on a daily basis, and the lower part shows the time-series change in the correlation values of the feature data on a monthly basis. In addition, the horizontal axis of the graph indicates time, and the vertical axis indicates the correlation value in the case where the second feature data at a certain time is acquired.

Figure 13:
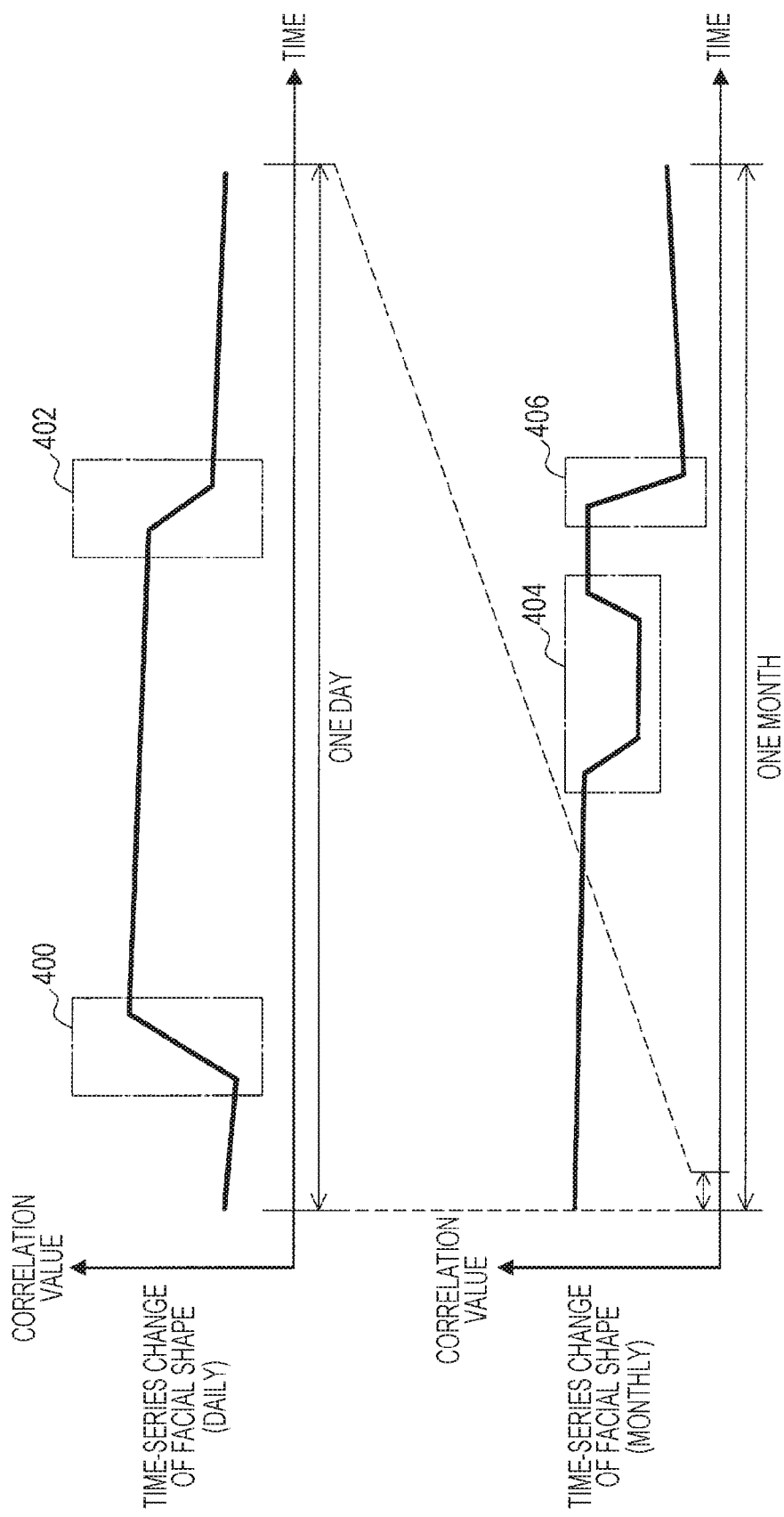
FIG. 13 is a diagram illustrated to describe an example of a time-series change in a correlation value of a facial shape in a modification according to an embodiment of the present disclosure.

FIG. 13 shows the relationship between the time-series change in the facial shape and the correlation value. The graph in the upper part of FIG. 13 is now described. In the daily change shown in the upper part of FIG. 13, it is assumed that, for example, a state in which the user 10 has arranged the hairstyle is registered as the first feature data. A period 400 indicates a period of time in which the facial shape approaches the first feature data and the correlation value significantly changes due to the user 10 arranging the hairstyle as the morning preparation. In addition, a period 402 indicates a period of time in which the correlation value changes slightly due to the user 10 taking a bath and the hairstyle being broken. The correlation value significantly differs depending on at what timing before and after each period the data acquisition control unit 130 acquires the feature data.

The lower graph of FIG. 13 is now described. In the monthly change shown in the lower part of FIG. 13, it is assumed that, for example, a facial shape at any given time point is registered as the first feature data. The correlation value changes, first, as a whole due to the change in hair growth. A period 404 indicates a period of time in which the correlation value decreases temporarily due to the user 10 changing the hairstyle. In addition, a period 406 indicates a period of time in which the correlation value decreases when a change in the hairstyle is large due to haircuts. The correlation value significantly differs depending on at what timing during each period and before and after each period the data acquisition control unit 130 acquires the feature data.

Figure 14:
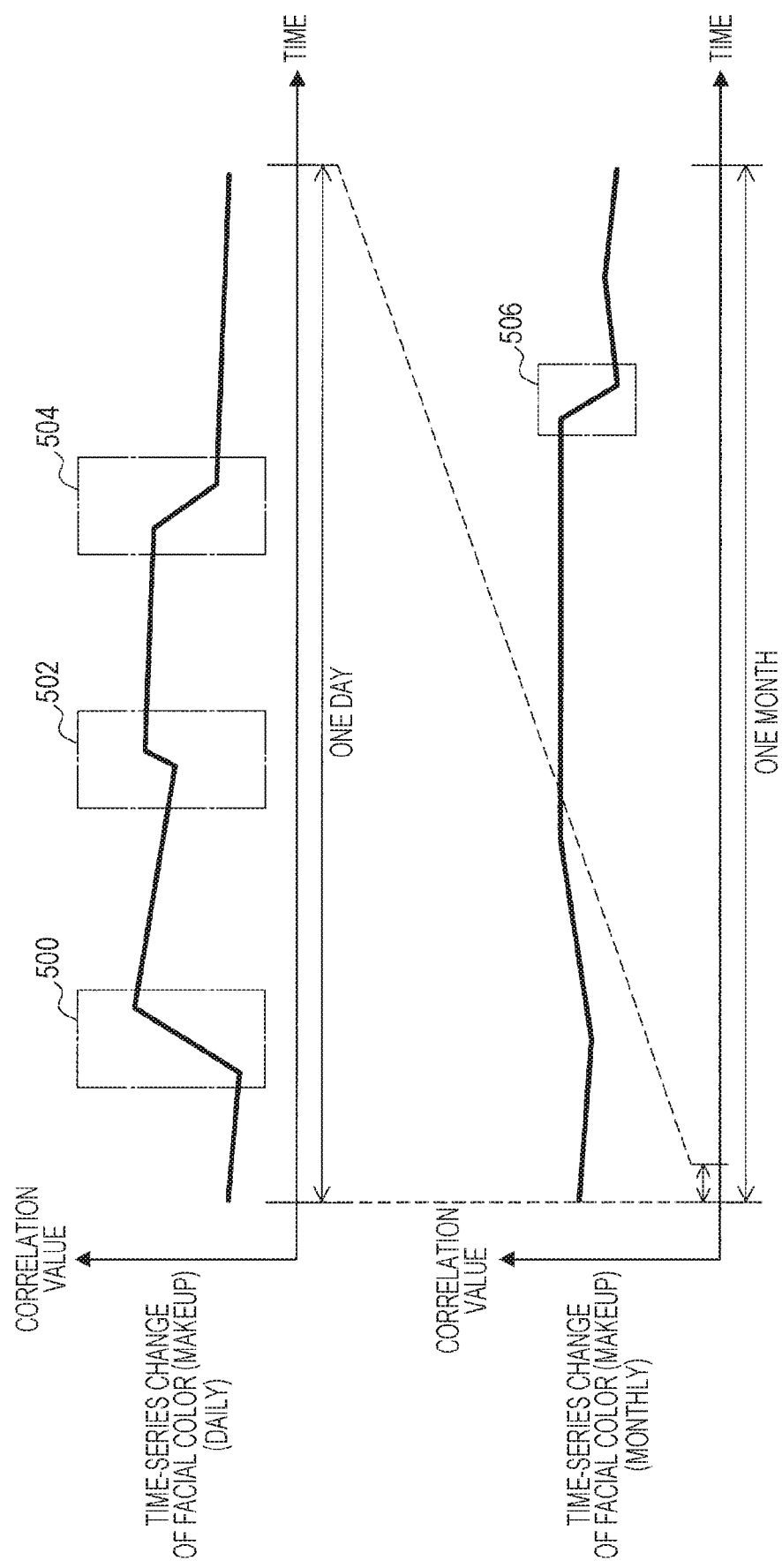
FIG. 14 is a diagram illustrated to describe an example of a time-series change in a correlation value of a facial color in a modification according to the present embodiment.

FIG. 14 shows the relationship between the time-series change in the facial color (makeup) and the correlation value. First, the upper graph in FIG. 14 is now described. In the daily change shown in the upper part of FIG. 14, it is assumed that, for example, a facial color in a state where the user 10 is wearing makeup is registered as the first feature data. A period 500 indicates a period of time in which the facial color approaches the first feature data and the correlation value increases due to the user 10 wearing makeup as the morning preparation. In addition, a period 502 indicates a period of time in which the facial color approaches the first feature data again and the correlation value increases due to the user 10 correcting the broken makeup. In addition, a period 504 indicates a period of time in which the correlation value decreases due to the user 10 removing the makeup after returning home. The correlation value significantly differs depending on at what timing before and after each period the data acquisition control unit 130 acquires the feature data.

The lower graph of FIG. 14 is now described. In the monthly change shown in the lower part of FIG. 14, it is assumed that, for example, a facial color at any given time point in time is registered as the first feature data. Even if the user 10 tries to wear the same makeup every day, the facial color after makeup does not typically match completely the first feature data due to the condition of the skin and the level of power of the user 10, or the like. Thus, the monthly correlation value repeats a slight change as a whole. Moreover, a period 506 indicates a period of time in which the correlation value decreases due to a large change in the facial color after the makeup due to the user 10 changing cosmetics and a makeup method. The correlation value significantly differs depending on at what timing before and after the period 506 the data acquisition control unit 130 acquires the feature data.

(Second Modification)

Features such as makeup, hairstyle, and clothes are features that can change daily. For example, in clothes, the daily correlation value will vary by changing the combination of clothes and accessories. Thus, in a case where there are clothes or accessories having high appearance frequency among a plurality of clothes and accessories, the clothes or accessories are regarded as a feature of the user 10, and the determination unit 132 can automatically add the clothes or accessories as new feature data. In addition, even if the correlation value between the second feature data such as makeup, hairstyle, clothes, or the like and the first feature data does not satisfy a predetermined condition, there is the case where the correlation value keeps a value equal to or larger than a predetermined reference or the case where the correlation value is equal to or larger than a predetermined reference over multiple days. In this case, the determination unit 132 can automatically add the second feature data such as makeup, hairstyle, and clothes as new first feature data. A change in the correlation value when the feature data is automatically added is now described in detail with reference to FIG. 15. Moreover, the configuration in FIG. 15 is the same as the configuration in FIGS. 13 and 14 described above.

FIG. 15 shows the relationship between the time-series change in clothes and the correlation value. The upper graph of FIG. 15 is now described. In the daily change shown in the upper part of FIG. 15, it is assumed that, for example, clothes of the user 10 going to work on one day are registered as the first feature data. A period 600 indicates a period of time in which the clothes approach the first feature data and the correlation value increases due to the user 10 changing the clothing into the clothes for going to work in the morning preparation. In addition, a period 602 indicates a period of time in which the correlation value decreases due to the user 10 taking off the jacket. In addition, a period 604 indicates a period of time in which the correlation value decreases due to the user 10 removing the tie. In addition, a period 606 indicates a period of time in which the correlation value returns to the same magnitude as that at the time of going to work due to the user 10 wearing the tie and jacket upon returning home. In addition, a period 608 indicates a period of time in which the correlation value decreases due to the user 10 changing the clothing into a dressing gown after returning home. The correlation value significantly differs depending on at what timing before and after each period the data acquisition control unit 130 acquires the feature data.

The lower graph of FIG. 15 is now described. In the monthly change shown in the lower part of FIG. 15, it is assumed that, for example, the clothes at any given time point are registered as the first feature data. In addition, in the lower graph of FIG. 15, as a pattern of the magnitude of the correlation value, it is assumed that there are three patterns of the first day having a high correlation value because all of the clothes match the first feature data, the second day having a slightly high correlation value because a part of the clothes matches the first feature data, and the third day having a low correlation value because the clothes hardly match the first feature data. The user 10 wears various combinations of clothes every day, so, in a period 610, more than half of one week is the third day. However, the determination unit 132 registers clothes and accessories having high appearance frequency as the first feature data, so as the day passes, the number of the third day decreases and the number of the second day increases. Then, as the first feature data increases, the determination unit 132 is capable of performing the collation using the integrated feature value of the plurality of feature data items, and in a period 612, more than half of one week is the first day and there is no third day.

(Third Modification)

Although in the above-described embodiment, the example is described in which the controller 102 performs access control based on the authentication processing for unlocking when the user 10 uses the mobile phone 100-1, the access control to be performed is not limited to unlocking. Furthermore, an authentication criterion can be set depending on the access control to be performed. For example, the controller 102 can set a security level for each of the applications mounted on a mobile phone as an authentication criterion in such a way that the feature data corresponding to the security level is used upon the authentication.

The security level and the feature data are associated with each other by setting a weight for each item and setting the security level and the feature data having the same weight to correspond to each other. Moreover, the setting of giving a weight for each of the security level and the feature data can be manually performed by the user 10. In addition, the weighting of the security level and the feature data can be set automatically by equipping an artificial intelligence (AI) system, for analyzing the past data, on terminal equipment in which the authentication system is installed and by giving the weight on the basis of the analyzed result.

(Fourth Modification)

Although in the above-described second embodiment, the example is described in which the authentication using depth map data is combined with the biometric authentication using biometric data, the authentication using depth map data can be combined with authentication using other data than biometric data. For example, a global positioning system (GPS) is added to the functional configuration of the mobile phone 100-2, and the authentication using position information of the user 10 that is acquired by the GPS can be combined with the authentication using the depth map data. In addition, for example, audio data such as the voice of the user 10 is acquired from the microphone 128, and the authentication using the acquired audio data can be combined with the authentication using depth map data.

The modifications according to an embodiment of the present disclosure are described above with reference to FIGS. 13 to 15. Moreover, although FIGS. 13 to 15 use the daily basis and the monthly basis as time units on the horizontal axis of the graph, the time units are not limited to a particular unit, and any time unit can be used. For example, units of minute, hour, week, and year can be used.

5. Application

Then, as an application example of the technology according to an embodiment of the present disclosure, an example in which the technology according to the present disclosure is applied to a device other than a communication terminal such as a mobile phone is described.

In recent years, a technology called the Internet of things (IoT) that connects various things to a network has attracted attention, and it is assumed that devices other than mobile phones and tablet terminals are usable for communication. For this reason, for example, by applying the technology according to the present disclosure to various devices having the movable configuration, it is possible to prevent unauthorized collation of the relevant device by the access control by an authentication system, resulting in preventing unauthorized use by the relevant device.

For example, in a case where the technology according to the present disclosure is applied to a camera device such as a wearable camera, the user is able to set the right to use the camera device by access control by an authentication system and to set the browsing authority or the like for a captured image (such as still image and moving image) or the like.

Further, in a case where the technology according to the present disclosure is applied to an unmanned aerial vehicle called a drone, it is possible for the user to set the right to use the drone by access control by the authentication system and to set restrictions (such as speed restriction and altitude restriction) regarding drone flight for each user.

As an application example of the technology according to an embodiment of the present disclosure, the example in which the technology according to the present disclosure is applied to a device other than a mobile terminal such as a mobile phone is described above.

6. Concluding Remarks

As can be seen from the above description, the authentication system according to the present disclosure is capable of automatically acquiring a plurality of user data items and acquiring feature data of the user on the basis of a time-series change in the plurality of user data items. In addition, the authentication system according to the present disclosure is capable of comparing a plurality of feature data items acquired at different timings, determining whether or not the plurality of feature data items indicates the same user feature, and controlling the authentication processing of the user depending on the determination result. As described above, it is possible to provide a novel and improved information processing apparatus, program, and information processing method, capable of preventing unauthorized collation.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Moreover, the authentication system described herein can be implemented as a single device or can be partially or wholly implemented as a separate device. For example, the data acquisition control unit 130, the determination unit 132, and the authentication control unit 134 of the controller 102 illustrated in FIG. 4 can be provided in a device such as a server that is connectable to the mobile phone 100-1 via a network.

Note that a series of processing performed by the respective devices described in the present specification may be achieved using any of software, hardware, and a combination of software and hardware. Programs that configure software are stored in advance in recording media (non-transitory media) provided inside or outside the respective devices, for example. Then, each program is read into RAM when execution by a computer, for example, and is executed by a processor such as CPU.

In addition, processing described in the present specification using flowcharts and sequence diagrams may not be necessarily executed in the illustrated order. Some processing steps may be executed in parallel. In addition, additional processing steps may be adopted, or some processing steps may be omitted.

Further, the effects described in this specification are merely illustrative or exemplified effects and are not necessarily limitative. That is, with or in the place of the above effects, the technology according to the present disclosure may achieve other effects that are clear to those skilled in the art on the basis of the description of this specification.

Additionally, the technical scope of the present disclosure may also be configured as below.

(1)

An information processing apparatus including:

a data acquisition unit configured to automatically acquire a plurality of user data items to acquire feature data of a user on the basis of a time-series change in the plurality of user data items;

a determination unit configured to compare a plurality of the feature data items acquired at different timings to determine whether or not the plurality of feature data items indicates an identical feature of the user; and a control unit configured to control authentication processing on the user depending on a first determination result that is a determination result obtained by the determination unit.

(2)

The information processing apparatus according to (1), in which the determination unit calculates a correlation value between first feature data acquired upon registration of the feature data and second feature data acquired upon collation of the feature data to determine whether or not the first feature data and the second feature data indicate an identical feature of the user on the basis of whether or not the correlation value satisfies a predetermined condition.

(3)

The information processing apparatus according to (2), in which the determination unit, in a case where the correlation value satisfies the predetermined condition, determines that the first feature data and the second feature data indicate an identical feature of the user, and in a case where the correlation value does not satisfy the predetermined condition, determines that the first feature data and the second feature data do not indicate an identical feature of the user.

(4)

The information processing apparatus according to (3), in which the determination unit performs the determination a plurality of times using an identical second feature data, and, in a case where the correlation value keeps a value equal to or larger than a predetermined criterion even if the correlation value does not satisfy the predetermined condition in any of the determination, automatically adds the second feature data as the first feature data.

(5)

The information processing apparatus according to any one of (1) to (4), in which the data acquisition unit acquires a plurality of user images as the plurality of user data items to acquire a change in motion of the user as the feature data on the basis of a time-series change in the plurality of user images.

(6)

The information processing apparatus according to (5), in which the data acquisition unit acquires a time-series change in motion of the user as feature data on the basis of a time-series change in image data and shape data included in the user image.

(7)

The information processing apparatus according to (6), in which the data acquisition unit images the user using an image-capturing device configured to acquire the user image including the image data and the shape data.

(8)

The information processing apparatus according to (7), in which the data acquisition unit acquires, by the image-capturing device, the user image including depth data indicating a distance from the image-capturing device to a target as the shape data.

(9)

The information processing apparatus according to any one of (1) to (8), in which the determination unit automatically adds, as first feature data, feature data having high frequency used as second feature data.

(10)

The information processing apparatus according to any one of (1) to (9), in which the control unit performs control of enabling the user to use the information processing apparatus in a case where the determination unit determines that first feature data and second feature data indicate an identical feature of the user.

(11)

The information processing apparatus according to (10), in which the control unit employs different authentication criteria during the authentication processing depending on processing controlled on the basis of the first determination result.

(12)

The information processing apparatus according to (11), in which the control unit performs the authentication processing using the feature data in which a weight corresponding to a weight that is set for each of the authentication criteria is set.

(13)

The information processing apparatus according to any one of (1) to (12), in which the data acquisition unit acquires biometric authentication data of the user, the determination unit compares a plurality of the biometric authentication data items acquired at different timings to acquire a second determination result that is a result obtained by determining whether or not the plurality of biometric authentication data items indicates an identical feature of the user, and the control unit controls the authentication processing on the user on the basis of the first determination result and the second determination result.

(14)

The information processing apparatus according to any one of (1) to (13), in which the data acquisition unit acquires the user data using a device configured to acquire biometric authentication data.

(15)

A program for causing a computer to function as:

a data acquisition unit configured to automatically acquire a plurality of user data items to acquire feature data of a user on the basis of a time-series change in the plurality of user data items;

a determination unit configured to compare a plurality of the feature data items acquired at different timings to determine whether or not the plurality of feature data items indicates an identical feature of the user; and a control unit configured to control authentication processing on the user depending on a first determination result that is a determination result obtained by the determination unit.

(16)

An information processing method executed by a processor, including:

acquiring automatically a plurality of user data items to acquire feature data of a user on the basis of a time-series change in the plurality of user data items;

comparing a plurality of the feature data items acquired at different timings to determine whether or not the plurality of feature data items indicates an identical feature of the user; and controlling authentication processing on the user depending on a first determination result that is a determination result obtained by a determination unit.

REFERENCE SIGNS LIST

100 Mobile phone
200 Mobile phone
102 Control unit
103 Control unit
120 Depth map acquisition unit
121 Biometric data acquisition unit
130 Data acquisition control unit
132 Determination unit
134 Authentication control unit
140 Data acquisition control unit
142 Determination unit
144 Authentication control unit

The invention claimed is:

1. An information processing apparatus comprising:
circuitry configured to
automatically acquire a plurality of user data items to acquire feature data of a user based on a time-series change in the plurality of user data items,
acquire biometric authentication data of the user,
compare a plurality of the feature data acquired at different timings to determine whether the plurality of the feature data indicates an identical feature of the user,
compare a plurality of the biometric authentication data acquired at different timings to acquire a second determination result that is a result obtained by determining whether the plurality of biometric authentication data indicates an identical biometric feature of the user, and
control authentication processing on the user based on a first determination result that is a determination result obtained by the comparing of the plurality of user data and the comparing of the plurality of the biometric authentication data for the second determination result.

2. The information processing apparatus according to claim 1, wherein the circuitry is configured to calculate a correlation value between first feature data acquired upon registration of the feature data and second feature data acquired upon collation of the feature data to determine whether the first feature data and the second feature data indicate the identical feature of the user based on whether the correlation value satisfies a predetermined condition.

3. The information processing apparatus according to claim 2, wherein the circuitry is configured to, in a first case where the correlation value satisfies the predetermined condition, determine that the first feature data and the second feature data indicate the identical feature of the user, and in a second case where the correlation value does not satisfy the predetermined condition, determine that the first feature data and the second feature data do not indicate the identical feature of the user.

4. The information processing apparatus according to claim 3, wherein the circuitry is configured to perform the determination a plurality of times using identical second feature data, and, in a third case where the correlation value keeps a value equal to or larger than a predetermined criterion even when the correlation value does not satisfy the predetermined condition in any of the determination, automatically adds the second feature data as the first feature data.

5. The information processing apparatus according to claim 1, wherein the circuitry is configured to acquire a plurality of user images as the plurality of user data items to acquire a change in motion of the user as the feature data based on a time-series change in the plurality of user images.

6. The information processing apparatus according to claim 5, wherein the circuitry is configured to acquire a time-series change in motion of the user as feature data based on a time-series change in image data and shape data included in the user image.

7. The information processing apparatus according to claim 6, wherein the circuitry is configured to image the user using an image-capturing device configured to acquire the user image including the image data and the shape data.

8. The information processing apparatus according to claim 7, wherein the circuitry is configured to acquire, by the image-capturing device, the user image including depth data indicating a distance from the image-capturing device to a target as the shape data.

9. The information processing apparatus according to claim 1, wherein the circuitry is configured to automatically add, as first feature data, feature data having frequency above a predetermined frequency threshold used as second feature data.

10. The information processing apparatus according to claim 1, wherein the circuitry is configured to control enabling the user to use the information processing apparatus in a case where the determination is that first feature data and second feature data indicate the identical feature of the user.

11. The information processing apparatus according to claim 10, wherein the circuitry is configured to employ different authentication criteria during the authentication processing depending on processing controlled based on the first determination result.

12. The information processing apparatus according to claim 11, wherein the circuitry is configured to perform the authentication processing using the feature data in which a weight corresponding to a weight that is set for each of the authentication criteria is set.

13. The information processing apparatus according to claim 1, wherein the circuitry is configured to acquire the user data using a device configured to also acquire the biometric authentication data.

14. A non-transitory computer-readable storage medium having stored thereon instructions that, when executed by one or more processors, causes the one or more processors to perform a method comprising:
automatically, acquiring a plurality of user data items to acquire feature data of a user based on a time-series change in the plurality of the user data items;
acquiring a plurality of user images as the plurality of user data items to acquire a change in motion of the user as the feature data based on a time-series change in the plurality of user images;
acquiring a time-series change in motion of the user as the feature data based on a time-series change in image data and shape data included in the user images;
comparing a plurality of the feature data acquired at different timings to determine whether the plurality of feature data indicates an identical feature of the user; and
controlling, authentication processing on the user depending on a first determination result that is a determination result obtained by said comparing the plurality of the feature data.

15. An information processing method executed by a processor, comprising:
acquiring automatically a plurality of user data items to acquire feature data of a user based on a time-series change in the plurality of the user data items;
acquiring biometric authentication data of the user;
comparing a plurality of the feature data acquired at different timings to determine whether the plurality of the feature data items indicates an identical feature of the user;
comparing a plurality of the biometric authentication data acquired at different timings to acquire a second determination result that is a result obtained by determining whether the plurality of biometric authentication data indicates an identical biometric feature of the user; and
controlling authentication processing on the user depending on a first determination result that is a determination result obtained by said comparing the plurality of the feature data and said comparing of the plurality of the biometric authentication data for the second determination result.

16. The information processing method according to claim 15, further comprising enabling the user to use the information processing apparatus in a case where the determination is that first feature data and second feature data indicate the identical feature of the user.

17. The information processing method according to claim 15, further comprising employing different authentication criteria during the authentication processing depending on processing controlled based on the first determination result.

18. The information processing method according to claim 15, wherein said acquiring the user data uses a device configured to also acquire the biometric authentication data.

* * * * *